United States Patent
Waldschläger

(10) Patent No.: US 12,106,867 B2
(45) Date of Patent: Oct. 1, 2024

(54) METHOD FOR SCANNING A SAMPLE BY MEANS OF X-RAY OPTICS AND AN APPARATUS FOR SCANNING A SAMPLE

(71) Applicant: BRUKER NANO GMBH, Berlin (DE)

(72) Inventor: Ulrich Waldschläger, Berlin (DE)

(73) Assignee: BRUKER NANO GMBH, Berlin (DE)

( * ) Notice: Subject to any disclaimer, the term of this patent is extended or adjusted under 35 U.S.C. 154(b) by 1657 days.

(21) Appl. No.: 15/325,958

(22) PCT Filed: Aug. 13, 2015

(86) PCT No.: PCT/EP2015/068637
§ 371 (c)(1),
(2) Date: Jan. 12, 2017

(87) PCT Pub. No.: WO2016/023975
PCT Pub. Date: Feb. 18, 2016

(65) Prior Publication Data
US 2017/0162287 A1   Jun. 8, 2017

(30) Foreign Application Priority Data

Aug. 13, 2014 (DE) .................... 10 2014 216 081.2
Sep. 26, 2014 (DE) .................... 10 2014 219 601.9

(51) Int. Cl.
*G01N 23/00* (2006.01)
*G01N 23/20008* (2018.01)
(Continued)

(52) U.S. Cl.
CPC ....... *G21K 1/067* (2013.01); *G01N 23/20008* (2013.01); *G01N 23/20016* (2013.01);
(Continued)

(58) Field of Classification Search
CPC ............. G21K 1/067; G01N 23/20008; G01N 23/20016
See application file for complete search history.

(56) References Cited

U.S. PATENT DOCUMENTS 4,317,036 A * 2/1982 Wang .................. G01N 23/223
378/146
5,497,008 A * 3/1996 Kumakhov ............ B82Y 10/00
250/505.1
(Continued)

FOREIGN PATENT DOCUMENTS

JP   H0 280944 A   3/1990
JP   H06-130194 A   5/1994
(Continued)

OTHER PUBLICATIONS

English Translation of Notice of Reason of Rejection corresponds to Japanese Application No. 2017-507980.
(Continued)

*Primary Examiner* — David P Porta
*Assistant Examiner* — Shun Lee
(74) *Attorney, Agent, or Firm* — Norris McLaughlin, P.A.

(57) ABSTRACT

A method for scanning a sample by means of X-ray optics for irradiating the sample with X-rays, comprises the following steps:
(a) displacing a measuring point, defined by an optical exit point of the X-ray optics, in the sample in a first scanning direction by means of swiveling the X-ray optics about a first swivel axis;
(b) detecting radiation emanating from the sample at, at least, two measuring points along the first scanning direction;
(c) combining measured values correlating with the detected radiation to form an overall scan.

11 Claims, 12 Drawing Sheets

(51) Int. Cl.
  *G01N 23/20016* (2018.01)
  *G21K 1/06* (2006.01)
  *G21K 7/00* (2006.01)
(52) U.S. Cl.
  CPC .......... *G01N 2223/33* (2013.01); *G21K 7/00* (2013.01); *G21K 2201/067* (2013.01)

(56) References Cited

U.S. PATENT DOCUMENTS

| | | | | |
|---|---|---|---|---|
| 5,529,277 | A | * | 6/1996 | Ostaszewski ........... F16C 11/12 248/398 |
| 9,700,277 | B2 | | 7/2017 | Okuno et al. |
| 9,971,121 | B2 | | 5/2018 | Baumann et al. |
| 2004/0168536 | A1 | * | 9/2004 | Bellouard ........... G11B 17/038 74/470 |
| 2004/0208283 | A1 | * | 10/2004 | Helming .............. G01N 23/203 378/70 |
| 2006/0088139 | A1 | | 4/2006 | Nakano et al. |
| 2006/0245548 | A1 | | 11/2006 | Callerame et al. |
| 2009/0022054 | A1 | | 1/2009 | Kim et al. |
| 2009/0220054 | A1 | * | 9/2009 | Baumann ................ H01J 35/00 378/205 |
| 2012/0294418 | A1 | | 11/2012 | Yellepeddi et al. |
| 2015/0250441 | A1 | | 9/2015 | Okuno et al. |
| 2015/0370032 | A1 | | 12/2015 | Baumann et al. |

FOREIGN PATENT DOCUMENTS

| | | |
|---|---|---|
| JP | H06-265485 A | 9/1994 |
| JP | 2014/054417 A1 | 4/2014 |
| WO | 97/22976 A1 | 6/1997 |
| WO | 97/25614 A1 | 7/1997 |
| WO | 2014/125043 A1 | 8/2014 |

OTHER PUBLICATIONS

Wiesemann et al.; "Construction of a Scanning Transmission X-ray Microscope at the Undulator U-41 at Bessy II"; Nuclear Instruments and Methods in Physic Research A, 467-468 (2001) p. 861-863.

International Search Report dated Oct. 20, 2015, mailed Oct. 28, 2015.

English Translation of International Search Report dated Oct. 20, 2015, mailed Oct. 28, 2015.

English-language translation of 1st German Office Action dated Feb. 9, 2015, for related German Application No. 10 2014 219 601.9.

English-language translation of 2nd German Office Action dated Jun. 8, 2016, for related German Application No. 10 2014 219 601.9.

* cited by examiner

METHOD FOR SCANNING A SAMPLE BY MEANS OF X-RAY OPTICS AND AN APPARATUS FOR SCANNING A SAMPLE

The invention relates to a method for scanning a sample by means of X-ray optics for irradiating a sample with X-rays. The invention also relates to an apparatus for scanning the sample, wherein the apparatus comprises X-ray optics.

BACKGROUND OF THE DISCLOSURE

According to the prior art, X-ray optics are adjusted within a measuring apparatus to a focal spot of an X-ray tube and aligned in a desired direction. One example of X-ray optics is a polycapillary X-ray lens. Polycapillary X-ray lenses comprise an entry focal point and an exit focal point.

During basic adjustment of the measuring apparatus, the entry focal point is brought into line with a focal spot on an X-ray tube. The focal spot is created by firing an anode with an electrode beam, wherein X-radiation is created. Because the entry focal point is brought into line with the focal spot, the largest proportion possible of the emitted X-radiation can be used to examine a sample.

To scan the sample the exit focal point of the X-ray optics is positioned on the sample. During the actual scanning process a sample table, on which the sample is arranged, is displaced in two different directions (x- and y-directions) and thus the sample is analyzed in these directions. This is also referred to as raster scanning The object of the invention is now to provide an improved method and an improved apparatus for scanning a sample.

SUMMARY OF THE DISCLOSURE

This object is achieved by a method and an apparatus with the features of the independent claims. Further preferred embodiments of the invention are indicated by the other features mentioned in the subclaims.

The method according to the invention for scanning a sample by means of X-ray optics for irradiating the sample with X-rays, comprises the following steps:
 (a) displacing a measuring point defined by an optical exit point of the X-ray optics in the sample in a first scanning direction by means of swiveling the X-ray optics about a first swivel axis;
 (b) detecting radiation emanating from the sample at, at least, two measuring points along the first scanning direction;
 (c) combining measured values correlating with the detected radiation to form an overall scan.

According to the invention, therefore, a displacement of a measuring point of the sample is performed by swiveling the X-ray optics, in order to scan (raster scan) the sample. The measuring point, particularly its position, size and/or form, is defined by X-rays emanating from the X-ray optics. Scanning is understood to be a metrological detection of properties, particularly material properties, as a function of the measuring point within the sample. It is thus a matter of spatially resolved data acquisition. At least in the first scanning direction (often also referred to as the fast direction/axis), for detection of the radiation emanating from the sample, a sample table, on which the sample is arranged, need not be displaced further. This allows greater scanning speeds to be achieved.

X-ray optics are general means for influencing a beam path of X-radiation. The swiveling can be an at least to some extent swiveling of the X-ray optics about the swivel axis. In this case, "at least to some extent swiveling about the swivel axis" can be understood as a rotational movement or a combination of a rotational and a translational movement. The goniometer mechanism, however, is configured so that for the typically (very small) swivel angles of the X-ray optics, a translational movement of the optical entry point away from or towards the (during the swiveling stationary) swivel axis in relation to a translational movement along the scanning direction can be disregarded.

The radiation emanating from the sample is detected during the swiveling or following individual (partial) swivel movements. The radiation emanating from the sample can, for example, be emitted, reflected or transmitted radiation. This can involve electromagnetic radiation, for example X-radiation or corpuscular radiation (electron beams). The emanating radiation is the result of irradiation of the measuring point with the X-rays leaving the X-ray optics.

Furthermore, measured values, correlating with the detected radiation, and thus dependent upon the detected radiation, are combined to form an overall scan. Here the overall scan can be a (multidimensional) data set, which can, for example, be output optically.

Combining the measured values into the overall scan takes place with spatial resolution according to the measuring point. The overall scan accordingly constitutes location-dependent sample information. This is preceded by a spatially resolved detection of the radiation emanating from the sample. In other words, the measured values correlating with the radiation detected are combined to form an overall scan, in which the measured values are associated with information on the location at which the emanating radiation was detected (the measuring point), (or the location information with measured values). The location information can in turn be determined as a function of a swivel angle of the swiveling of the X-ray optics—by way of example through the application of at least one angle function. "Spatially resolved" means a spatial resolution within a sample plane to be scanned of a sample, e.g. along a surface of the sample, particularly in the form of x,y-coordinates. Hence scanning (thus raster scanning) of the sample by means of swiveling the X-ray optics is enabled.

It is preferably provided that the method also comprises the following steps after step (b):
 displacing the measuring point in the sample in a second scanning direction by means of swiveling the X-ray optics about a second swivel axis; and
 repeating steps (a) and (b).

Thus, a displacement of the measuring point in the sample also takes place in the second scanning direction by means of swiveling the X-ray optics. The second scanning direction is different from the first scanning direction. Furthermore, the first swivel axis is also different from the second swivel axis. Next, in turn, the displacement occurs of the measuring point in the sample defined by an optical exit point of the X-ray optics, in the first scanning direction, by means of swiveling the X-ray optics about a first swivel axis. In this case the first scanning direction can have a negative sign, so that the X-ray optics are swiveled back along the first scanning direction. Furthermore, in turn, the detection of radiation emanating from the sample at, at least, two measuring points along the first scanning direction takes place. The radiation detected in the first scanning direction can be referred to as a detected "line". The lines are thus detected alternately in the positive or negative first scanning direction, allowing particularly fast scanning to be achieved.

Alternatively, before, after, or during the displacement in the second scanning direction, the X-ray optics are initially swiveled back in the negative first scanning direction. A line return is thus performed. Next, in turn, the measuring point is displaced in the positive first scanning direction and the radiation emanating from the sample detected at, at least, two measuring points along the positive first scanning direction. Through the line return after each line detected (along the first scanning direction) mechanical errors are suppressed.

The displacement of the measuring point and the detection of the emanating radiation can take place continuously or discontinuously (gradually). With the continuous displacement and detection, the emanating radiation is detected while the measuring point is being displaced. Steps (a) and (b) are thus performed simultaneously. A definition of individual measuring points of the overall scan can subsequently be performed by assignment of the measured values correlating with the detected radiation with corresponding positional data. With gradual displacement and detection, however, the measuring point is first displaced and then the emanating radiation detected. Step (a) is thus carried out before step (b).

In connection with the present invention, reference is made to a spatially-fixed, three-dimensional, Cartesian system of coordinates, comprising a point of origin and an x-axis, a y-axis and a z-axis extending from this. Each individual axis is arranged orthogonally to the other axes.

In this application, unless otherwise stated, the term "direction" indicates the spatially-fixed (stationary) direction irrespective of sign. The first scanning direction runs particularly in the x-direction, while the second scanning direction runs particularly in the y-direction. Both scanning directions are thus particularly aligned orthogonally (at right-angles) to one another.

The first scanning direction (x-direction) thus refers to a direction, which points in the direction of the positive or negative first scanning direction (x-axis).

The second scanning direction (y-direction) thus refers to a direction, which points in the direction of the positive or negative second scanning direction (y-axis).

A z-direction thus refers to a direction, which points in the direction of the positive or negative z-axis.

The z-direction particularly thus refers to a direction of an optical axis of the X-ray optics in a starting position of the X-ray optics, thus in a mid-point of the swiveling.

The first and the second scanning directions run particularly in the sample plane, which can also be referred to as the x,y-plane. The sample plane thus runs particularly at right-angles to the z-direction. The first and the second swivel axes can thus particularly run parallel to the sample plane (and/or a sample table).

The first swivel axis runs particularly at right-angles to the first swivel direction. Furthermore, the second swivel axis runs particularly at right-angles to the second swivel direction. The first and the second swivel axis are particularly arranged at right-angles to one another. The second swivel axis particularly intersects the first swivel axis.

It is preferably provided that the first swivel axis and/or the second swivel axis run through an optical entry point of the X-ray optics. Thus, with an optimum adjustment of the optical entry point on a focal spot of an anode (x-ray tube), the at least one swivel axis passes through the focal spot. This ensures that during swiveling of the X-ray optics the intensity of the radiation guided through the X-ray optics is maintained. Thus, when the X-ray optics are swiveled there is essentially no loss in intensity of the X-rays used for irradiating the sample.

It is preferably provided that a maximum swivel angle during swiveling of the X-ray optics is at most+−5° (thus in total 10°), particularly at most+−3° (thus in total 6°), preferably at most+−2° (thus in total 4°). This ensures that the optical exit point of the X-ray optics, which defines the measuring point, is displaced only insignificantly in the z-direction during swiveling of the X-ray optics. In this way, a displacement of the measuring point within the sample in the z-direction, is reduced or straying of the optical entry point outside the sample prevented. The displacement of the optical exit point in the z-direction is particularly at most 0.4 mm, preferably at most 0.2 mm, particularly preferably at most 0.1 mm.

Furthermore, the method comprises a step of displacement of the sample in the first scanning direction and/or the second scanning direction. When the sample is displaced without simultaneous swiveling of the X-ray optics, while the measuring point remains in a stationary coordinate system at the same point, the sample is displaced relative to the measuring point. Thus, on the one hand, for example, only in the first scanning direction can the measuring point be displaced by means of swiveling the X-ray optics about the first swivel axis, while a displacement of the measuring point in the second scanning direction relative to the sample by means of the displacement of the sample takes place. Furthermore, relatively large displacements of the measuring point relative to the sample can take place by means of the displacement of the sample, whereas relatively small displacements of the measuring point by means of the swiveling of the X-ray optics can take place.

The apparatus according to the invention for scanning a sample comprises:
X-ray optics for irradiating a sample with X-rays;
a goniometer mechanism connected to the X-ray optics, wherein the goniometer mechanism is configured to carry out a swiveling of the X-ray optics about a first swivel axis;
at least one actuator, which is configured to actuate the goniometer mechanism; and
a control device, which is configured to carry out the method as claimed in one of the preceding claims.

The X-ray optics can be aligned in a starting position in the z-direction, wherein the first swivel axis extends in a direction different from the z-direction. The X-ray optics can, for example, be mechanically connected to the goniometer mechanism with a form and/or friction fit, particularly by means of a screwed connection. By means of the at least one actuator, the X-ray optics can be swiveled about at least one swivel axis. A particularly suitable goniometer mechanism for this is described in PCT/EP2014/052852, the content of which is incorporated into this application. Furthermore, the apparatus can comprise a detector configured for detecting radiation emanating from the sample.

The at least one swivel axis refers to an imaginary, non-physical swivel axis, which is predetermined by the structural properties of the apparatus, and about which the X-ray optics can be swiveled at least approximately by the goniometer mechanism.

It is preferably provided that the apparatus for displacing the sample is configured in the first scanning direction and/or the second scanning direction. To that end, the apparatus can particularly comprise a sample table displaceable in the first and/or second scanning direction, which for example comprises a seat for a sample holder.

It is particularly preferably provided that the goniometer mechanism is arranged to perform a swiveling of the X-ray optics about a second swivel axis. This allows a displacement of the measuring point in the sample in a second scanning direction by means of swiveling the X-ray optics about the second swivel axis. A displaceable sample table for performing measurements in the first and second scanning direction can be dispensed with.

It is preferably provided that the X-ray optics comprise an X-ray lens, particularly a capillary lens, preferably a polycapillary lens. Polycapillary lenses are particularly suitable for detecting X-rays in a focal spot of an X-ray tube and bundling these in the measuring point of the sample.

X-ray optics can comprise an optical entry point and an optical exit point. The optical entry point is an entry-side point, having a defined, and thus predetermined spatial position, in relation to the X-ray optics. The entry point is typically spaced apart from the X-ray optics, thus upstream of the X-ray optics in relation to the beam propagation. Similarly, the optical exit point is an exit-side point, having a defined, and thus predetermined spatial position, in relation to the X-ray optics. The exit point is also typically spaced apart from the X-ray optics, thus downstream of the X-ray optics in relation to the beam propagation.

The entry and exit point can be defined by X-ray optical properties of the X-ray optics. The entry point is preferably an entry focal point and the exit point an exit focal point. Furthermore, the entry and exit points can also be points which, for example, are only partly determined by the properties of the X-ray optics. This can, by way of example, be the case when the entry and exit point are arranged on one lens axis, for example an axis of symmetry (thus a central axis) of the X-ray optics, but their distances from the X-ray optics are not determined by the actual X-ray optics. The distances from the X-ray optics can be determined based on further considerations (influenced, for example, by environmental parameters), or also as desired. In principle, depending on the application, any entry- and exit-side points can be selected as the entry and exit points (with positions determined in relation to the X-ray optics prior to the adjustment).

X-ray lenses have as their optical entry point an entry focal point and as their optical exit point an exit focal point. Capillary lenses have at least one internal capillary, particularly a plurality of capillaries. The capillaries of the capillary lens are typically arranged and formed such that via these, by means of total reflection, X-rays passing through are captured in the entry focal point and guided to the exit focal point.

The X-ray optics are preferably HOPG (Highly Oriented Pyrolytic Graphite) optics or HAPG (Highly Annealed Pyrolytic Graphite) optics. In this case also, the optical entry point is an entry focal point and the optical exit point is an exit focal point.

Elliptical monocapillary X-ray optics are preferred. The elliptical monocapillary comprises as the optical entry point a source focal point and as the optical exit point an exit focal point.

Furthermore, the X-ray optics are preferably a cylindrical monocapillary. The optical entry and exit points of the cylindrical monocapillary are (as already generally defined above in relation to the X-ray optics) entry- and exit-side points with a defined spatial position in relation to the X-ray optics. Preferably, at least the optical entry point lies on an axis of symmetry of the monocapillaries.

The actuator preferably comprises an electric motor, particularly a linear motor, or a piezo element. Inexpensive electric motors are available in the most varied of designs. Piezo elements are particularly characterized by high accuracy with relatively small adjustment paths.

The goniometer mechanism preferably comprises at least one trapezoidal guide. The trapezoidal guide is particularly an isosceles, symmetrical, trapezoidal guide. "Isosceles and symmetrical" and the term "trapezoidal", similar to a parallelogram guide, refer to the functional geometry of the guide and not necessarily to the optical appearance of the guide. If the goniometer mechanism comprises two trapezoidal guides, then these can be referred to as a first trapezoidal guide and a second trapezoidal guide.

By means of trapezoidal guides, with relatively low expenditure and space requirement, a swivel movement of the X-ray optics can at least to some extent be performed. Through the kinematics of the trapezoidal guide, during the swivel movement the X-ray optics also always describe a relatively low translational movement. To keep the translational movement in both swivel directions as equal and small as possible, the starting position can be selected so that the guide describes an isosceles, symmetrical, trapezoidal form. During swiveling of the X-ray optics, the two sides of the trapezoidal guide, still parallel in the starting position are swiveled slightly towards each other. The trapezoidal guide can thus generally also be referred to as a rectangular guide with a pair of opposing sides of equal length.

In practice, during swiveling of the X-ray optics, the translational movement of the X-ray optics resulting from the kinematics of the trapezoidal guide can be disregarded. To that end, the swivel angle is preferably at most+−5°, particularly at most+−3°, preferably at most+−2°. The translation of optical entry point in relation to the swivel axis is preferably at most+−0.2 mm/°, particularly at most+−0.1 mm/°. A rotation of the connecting element in relation to a stationary counter-element (and starting from the starting position) during the goniometer movement is preferably at most+−5°, furthermore preferably at most+−3°, particularly at most +−2°. The smaller the swivel, the lower the amount of translational movement between the optical entry point and the focal spot, to which the entry point was previously adjusted.

It is particularly provided that the at least one trapezoidal guide comprises a first counter-element and a second counter-element, which are connected by means of a pair of (particularly articulated) connecting elements. The articulated connections are particularly created by means of flexure bearings. For an ideal functioning, the two connecting elements are of equal length between their respective two connections with the counter-elements. The distance to sides of the counter-element, facing towards the axis of rotation, is less between the connections with the connecting elements than the corresponding distance to sides of the other counter-element, however.

A trapezoidal guide can result in the following geometry:

A first connection plane runs parallel to the swivel axis of the guide and through the articulated connections on sides of the first counter-element. Similarly, a second connection plane runs parallel to the swivel axis of the guide and through the articulated connections on sides of the second counter-element. The first connection plane is arranged between the swivel axis and the second connection plane. In addition, a further plane runs through the ends of a first connecting element connecting with the counter-elements, both intersection lines of which are aligned with the connection planes in the direction of the swivel axis. A further plane run through the ends of the second connecting element connecting with the counter-elements, both intersection lines of which are aligned with the connection planes in the in direction of the swivel axis. Along the first connection plane a first distance of the two planes through the connecting element is smaller than a second distance of the two planes along the second connection plane. In addition, a distance between the articulated connections of the first connecting element with the first counter-element and with the second counter-element along the plane of the connecting element is equal to the corresponding distance of the second connecting element. In "conventional" hinges, the connection planes run through axes of rotation of the articulated connections, wherein the axes of rotation run in the direction of the swivel axes. The articulated connections are particularly implemented by means of flexure bearings. With flexure bearings, the connection planes run through the flexure bearings, particularly through those ends of the flexure bearings, pointing away from the connecting elements.

In the starting position the two connection planes are typically arranged parallel to one another. Looking at the four planes laterally, and thus such that they appear as straight lines, the four planes form an isosceles, symmetrical trapezoid.

During a goniometer movement, the angles between the two connecting elements and the two counter-elements change. In this way one counter-element performs the goniometer movement in relation to the other counter-element.

A preferred embodiment of the invention provides that the first trapezoidal guide for the at least to some extent swiveling of the X-ray optics about the first swivel axis, comprises a first counter-element,
a second counter-element, and
a pair of connecting elements, connecting the two counter-elements, wherein
the connecting elements of the pair of connecting elements in a first connection plane, running along the direction of the extension of the first swivel axis, in each case are connected via at least a first end with the first counter-element, and
the connecting elements of the pair of connecting elements in a second connection plane, running along the direction of the extension of the first swivel axis and (in the area of the first trapezoidal guide) arranged on the side of the first connection plane facing away from the first swivel axis and at a distance from the first connection plane, are in each case connected via at least a second end with the second counter-element, and
in a direction running along the first connection plane and at right angles to the first swivel axis the at least one first end of one of the connecting elements has a first distance to the at least one first end of the other connecting element and in a direction running along the second connection plane and at right angles to the first swivel axis the at least one second end of one of the connecting elements has a second distance to the at least one second end of the other connecting element, wherein the first distance is smaller than the second distance, and
in directions along the course of a plane, running at right angles to the first swivel axis, the respective distances of the respective, at least one first end, to the respective, at least one second end of the connecting elements are equal, and
the first trapezoidal guide is mechanically connected via one of its counter-elements with the receiving element and thus the to some extent swiveling of the X-ray optics about the first swivel axis can be implemented by a swiveling of the counter-element mechanically connected to the receiving element in relation to the other counter-element.

A further preferred embodiment of the invention provides that the second trapezoidal guide for the at least to some extent swiveling of the X-ray optics about the second swivel axis, comprises a first counter-element,
a second counter-element, and
a pair of connecting elements, connecting the two counter-elements, wherein
the connecting elements of the pair of connecting elements in a first connection plane, running along the direction of the extension of the second swivel axis, in each case are connected via at least a first end with the first counter-element, and
the connecting elements of the pair of connecting elements in a second connection plane, running along the direction of the extension of the second swivel axis and (in the area of the second trapezoidal guide) arranged on the side of the first connection plane facing away from the second swivel axis and at a distance from the first connection plane, are in each case connected via at least a second end with the second counter-element, and
in a direction running along the first connection plane and at right angles to the second swivel axis the at least one first end of one of the connecting elements has a first distance to the at least one first end of the other connecting element and in a direction running along the second connection plane and at right angles to the second swivel axis the at least one second end of one of the connecting elements has a second distance to the at least one second end of the other connecting element, wherein the first distance is smaller than the second distance, and
in directions along the course of a plane, running at right angles to the second swivel axis, the respective distances of the respective, at least one first end, to the respective, at least one second end of the connecting elements are equal, and
the second trapezoidal guide is mechanically connected via one of its counter-elements with the receiving element and thus the to some extent swiveling of the X-ray optics about the first swivel axis can be implemented by a swiveling of the counter-element mechanically connected to the receiving element in relation to the other counter-element.

The first connection planes run at a distance to the respective swivel axis. The reference to a direction which runs "along" a plane, can also be understood to refer to as a direction running parallel to this plane.

One of the counter-elements is thus that part of the trapezoidal guide, which can perform the swivel movement in relation to the counter-element about the respective swivel axis. The receiving element is mechanically connected to the counter-element that can be displaced in parallel, particularly integrally connected. The connecting elements of the pair of connecting elements are arms that join the two counter-elements together.

The connecting elements are joined with the counter-elements on the ends of the connecting elements. This connection is carried out such that at least to some extent a rotation of the connecting elements relative to the counter-elements is enabled. Here the to some extent rotation can comprise a rotational and a translational component. Here the rotational component comprises a vector pointing in a direction parallel to the swivel axis. Here the vector is at right-angles to the plane in which the rotation takes place.

A connecting element comprises at least a first end and at least a second end. Where there are multiple first and/or second ends per connecting element in each case the first ends and/or the second ends are arranged offset in the direction of the respective swivel axis of the guide. Thus, both the first and second ends of the respective connecting element are in the same plane. This plane thus extends similarly in the direction of the respective swivel axis.

In the starting position the first and the second connection planes of the respective trapezoidal guide are typically arranged parallel to one another. The trapezoid thus appears as a symmetrical, isosceles trapezoid.

The apparatus preferably comprises two trapezoidal guides, wherein the first counter-elements are arranged between the second counter-element of the respective guide and the first swivel axis and the two of the first counter-elements or two of the second counter-elements of the at least two guides are connected immovably to one another or have a one-piece embodiment. Thus, the first counter-elements are arranged on a side facing towards the first swivel axis and the second counter-elements on a side facing away from the first swivel axis. Thus, the two trapezoidal guides are connected with each other via their respective first or second counter-element, or the two trapezoidal guides share a first or second counter-element. This results in a space-saving, compact, nested construction of the two guides. The two counter-elements of the trapezoidal guides, which are not connected immovably to one another or do not have a one-piece embodiment, are typically spaced apart in a direction at right angles to one of the connection planes of the unconnected counter-elements, allowing a relative movement between these.

It is preferably provided that
the first counter-element of the first trapezoidal guide is immovably connected to the X-ray optics,
the second counter-element of the first trapezoidal guide is immovably connected to the second counter-element of the second trapezoidal guide or has a one-piece embodiment with this, and
the first counter-element of the second trapezoidal guide is intended for fixing the apparatus.

This embodiment results in a particularly compact design of the goniometer mechanism. The immovable connection with the X-ray optics is typically detachable.

The trapezoidal guides are preferably arranged in relation to one another such that the X-ray optics can be located substantially centrally, between the respective two connecting elements of the pair of connecting elements. Through the central arrangement of the X-ray optics between the connecting elements of the pair of connecting elements, a compact arrangement is achieved. To this end the goniometer mechanism (particularly the at least one trapezoidal guide) can have an opening running through it, within which the X-ray optics are arranged.

It is preferably provided that the goniometer mechanism, particularly the at least one trapezoidal guide, comprises flexure bearings. Solid state hinges are characterized by the elimination of breakaway torques. Thus, a low-vibration and precise swiveling can be performed, as a result of which the method according to the invention particularly in combination with the trapezoidal guide is decisively improved. The flexure bearings particularly allow a reduction in the number of parts compared to "conventional" kinematics.

The flexure bearings are particularly flat bodies, the main surfaces of which (the surfaces with the greatest surface area), in a trapezoidal guide, point substantially in a direction, extending along the respective connection plane and at right angles to the swivel axis. In other words, the flexure bearings extend with their main prolongation along planes, running at right-angles to the respective connection plane and in the direction of the respective swivel axis. Thus, a flexibility of the flexure bearings in the direction at right angles to the swivel axis along the respective connection plane is less than in other directions. This allows a specific bending in the desired direction with relatively little effort. The connecting elements are preferably substantially fixed in relation to the flexure bearings.

It is preferably provided that the trapezoidal guides have a nested arrangement. The trapezoidal guides particularly have a coaxial nested arrangement. The trapezoidal guides can particularly be configured as hollow cylinders. Furthermore, at least one of the guides can comprise an opening, in which at least one of the other guides is arranged.

A preferred embodiment of the invention provides that the two trapezoidal guides have a rotated and nested arrangement. The guides can be arranged rotated in relation to each other about an (optical) axis of the X-ray optics, particularly about a lens axis (e.g. a connecting line, connecting the entry point and the exit point) of an X-ray lens. The guides particularly have a nested arrangement such that the inner guide is arranged between the connecting elements of the outer guide. This results in a particularly compact design of the apparatus.

It is preferably provided that the goniometer mechanism has a one-piece configuration. The one-piece configurations can, for example be created by turning, milling, drilling and or wire eroding. This allows low-cost production, through which the apparatus can achieve a cost advantage over conventional adjusters.

It is preferably provided that actuators are configured to introduce a first pivot force into the first counter-element of the first trapezoidal guide, wherein the first pivot force comprises a component in the first scanning direction (as a result of which the to some extent swiveling of the X-ray optics about the first swivel axis can be performed), and particularly
to introduce a second pivot force into the first counter-element of the first trapezoidal guide, wherein the second pivot force comprises a component in the second scanning direction, which can be guided via the connecting elements of the first trapezoidal guide to the second counter-element of the first and the second trapezoidal guide (as a result of which to some extent swiveling of the X-ray optics about the second swivel axis can be performed).

This ensures space-saving by the goniometer mechanism on just one side of the goniometer mechanism. The amounts of components preferably substantially correspond to the respective amounts of the adjustment forces.

The adjustment forces cause the swiveling of the first counter-element. The respective actuator applies, for example, a compressive force with a positive sign to the first counter-element, for swiveling the goniometer mechanism in a scanning direction with a positive sign and a tractive force on the counter-element for swiveling of the goniometer mechanism in a scanning direction with a negative sign, wherein the forces of the actuators and those of an elastic recovery of the flexure bearings can at least compensate or also overcompensate one another.

The apparatus preferably has a height of preferably 30 mm-150 mm, particularly 40 mm-70 mm in the z-direction and/or a diameter of preferably 20 mm-100, particularly 30 mm-50 mm substantially perpendicularly to the z-direction.

The invention is explained in the following by exemplary embodiments using the associated drawings.

DETAILED DESCRIPTION

The method according to the invention for scanning a sample 99 by means of X-ray optics 100 is described by means of FIGS. 11-14 and the associated description of the figures.

Figure 1:
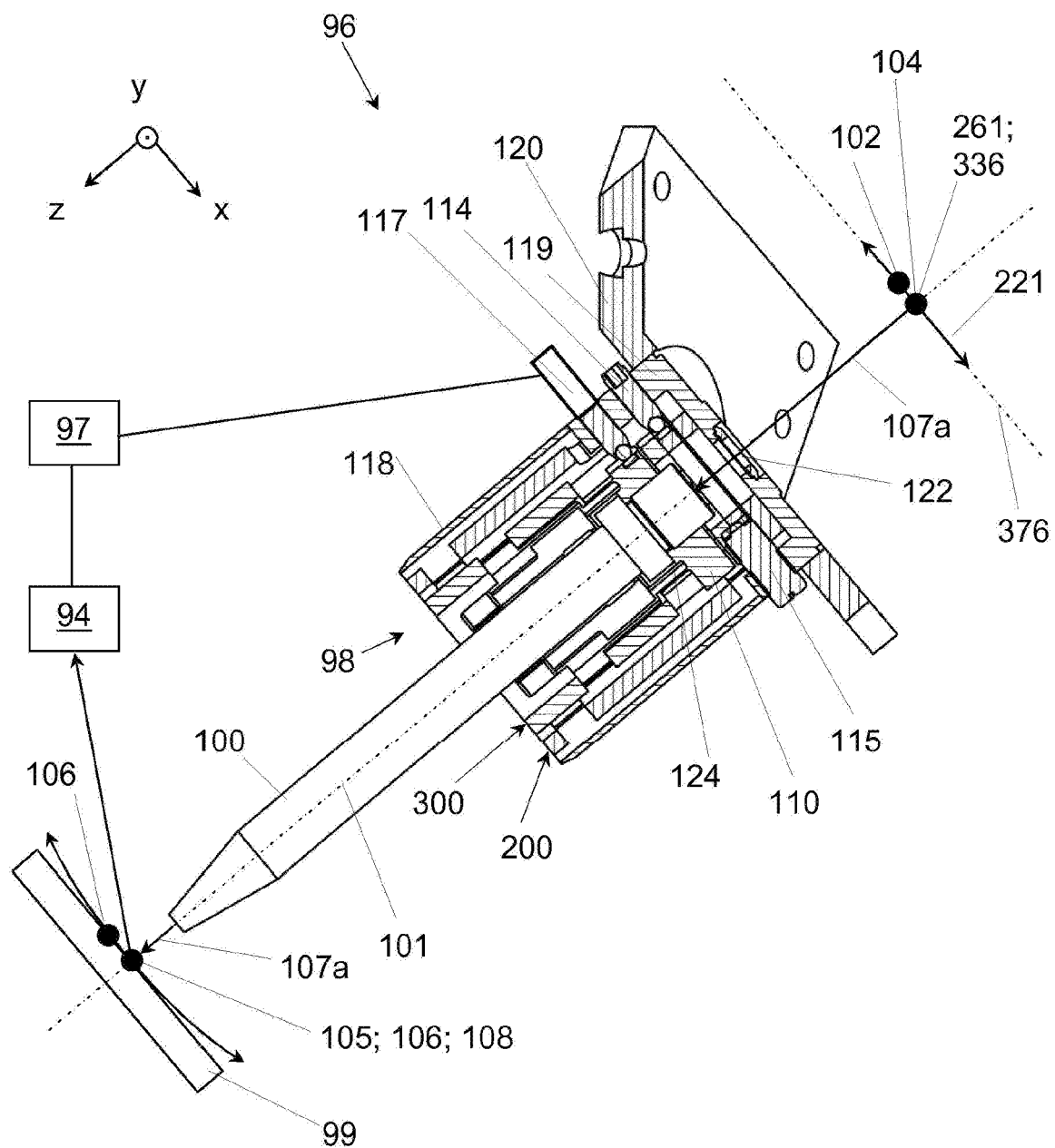
FIG. 1 a sectional view of an apparatus.

FIG. 1 is a sectional view of an apparatus 96 according to a preferred embodiment of the invention viewed counter to a y-axis in a negative y-direction. A circle with a central cross symbolizes an arrow looking in the direction of the arrow, while a circle with a central dot symbolizes a view in the opposite direction to the arrow.

The apparatus 96 comprises X-ray optics 100, for example a capillary lens 100 (a polycapillary lens) for irradiating a sample 99 with X-rays. Furthermore, the apparatus 96 comprises a goniometer mechanism 300 connected to the X-ray optics 100, wherein the goniometer mechanism 300 is configured to carry out a swiveling of the X-ray optics 100 about a first swivel axis 336. The apparatus 96 further comprises at least one actuator 117, for example an electric motor, configured to operate the goniometer mechanism 300, and a control device 97 for controlling the at least one actuator 117.

The goniometer mechanism 300 can be configured to perform a swiveling of the X-ray optics 100 about a second swivel axis 376.

The goniometer mechanism 300 can be part of a particularly advantageously designed device 98 for spatial alignment of the X-ray optics 100, which is described as follows:

The device 98 can be arranged in a housing with a first housing part 118, a second housing part 119 and a holder 120 (for securing the apparatus 96). The apparatus 96 further comprises a capillary lens 100, shown in a lens housing and not in cross section.

The device 98 and the lens 100 are typically operated in an area with reduced pressure (partial vacuum). A vacuum seal is made typically along an outer surface of the first housing part 118. Here the holder 120 is arranged outside the vacuum. The side of the second housing part 119 facing the device is on the side of the vacuum, the other side outside the vacuum. Thus, the at least one actuator 117 is arranged outside the vacuum. Furthermore, adjustment elements 114 (for example, a fine screw drive) for operation of a parallel displacement mechanism 200 can be operated from outside the vacuum. A counterforce to an adjustment force of the adjustment elements 114 and the at least one actuator 117 can be applied by means of spring elements 115. The adjustment elements 114 and spring elements 115 can be sealed using grease in the second housing part 119.

By means of the visible adjustment element 114 the device 98 can be operated such that a parallel displacement in a first parallel displacement direction 221 is performed. Furthermore, by means of the actuator 117 an at least to some extent swiveling of the lens 100 about a first swivel axis 336 (shown projected as a dot) can be performed. Displacements of the lens 100 in the z-direction caused by the swiveling of the lens 100 can normally be disregarded. By means of a further adjustment element (not shown) the device 98 can be operated such that a parallel displacement in a second parallel displacement direction 261 (shown projected as a dot) can be performed. Furthermore, by means of a further actuator (not shown) an at least to some extent swiveling of the lens 100 about a second swivel axis 376 can be performed.

In the example shown, both the two parallel displacement directions 221, 261, and the two swivel axes 336, 376 run in x,y-directions, thus within an x,y-plane.

Specifically, as shown, the first parallel displacement direction 221 and the second swivel axis 376 can extend in the x-direction and the second parallel displacement direction 261 and the first swivel axis 336 in the y-direction. The two parallel displacement directions 221, 261, and also the two swivel axes 336, 376, can thus make a right-angle to one another.

In the starting position shown, the lens 100 is aligned by means of a receiving element 110 in the z-direction and comprises an optical entry point 104 and an optical exit point 108, which are spaced apart from one another in the z-direction. Since the X-ray optics 100 shown involve a capillary lens 100, the optical entry point 104 is an entry focal point 104 and the optical exit point 108 an exit focal point 108. Thus, one axis 101 of the X-ray optics 100, in the case shown a lens axis 101 of the lens, is aligned in the z-direction and the lens 100 is penetrable by X-rays in the z-direction. In addition, the entry focal point 104 of the lens 100 is positioned by means of the receiving element 110 in the point of intersection of the two swivel axes 336, 376. A window 122 in the second housing part 119 guarantees the most interference-free possible transmission of the X-rays and a vacuum seal.

Before adjustment of the entry focal point 104 to a first predetermined point 102 (for example a focal spot of an anode) a check is first made whether there is any deviation of the entry focal point 104 from the first predetermined point 102 in the z-direction. Minor deviations can if necessary be compensated prior to the remainder of the adjustment by means of spacers (not shown) of different thicknesses at position 124 between the receiving element 110 and the lens 100.

For the adjustment, initially the entry focal point 104 in the parallel displacements 221, 261 is adjusted to the predetermined point 102, thus made to coincide with the predetermined point 102. Here the swivel axes 336, 376 are displaced together with the entry focal point 104, so that the point of intersection of the swivel axes 336, 376 also corresponds with the predetermined point. It is thus ensured that in a subsequent swiveling of the lens 100 about the swivel axes 336, 376 the entry focal point 104 remains adjusted to the predetermined point 102.

For adjusting the exit focal point 108 to a measuring point in the sample, a distance between the exit focal point 108 and the desired measuring point in the sample is reduced until it is substantially equal to zero. This can, by way of example, be performed by adjusting the sample table in the z-direction.

As a result of the adjustment, the entry focal point is adjusted to the predetermined point 104 and the exit focal point 108 to the central measuring point 105.

The distances shown between the apparatus 96 and the swivel axes 336, 376, the two focal points 104, 108, as well as the predetermined point 102 and the central measuring point 105, are not shown to scale in the figures.

Figure 2:
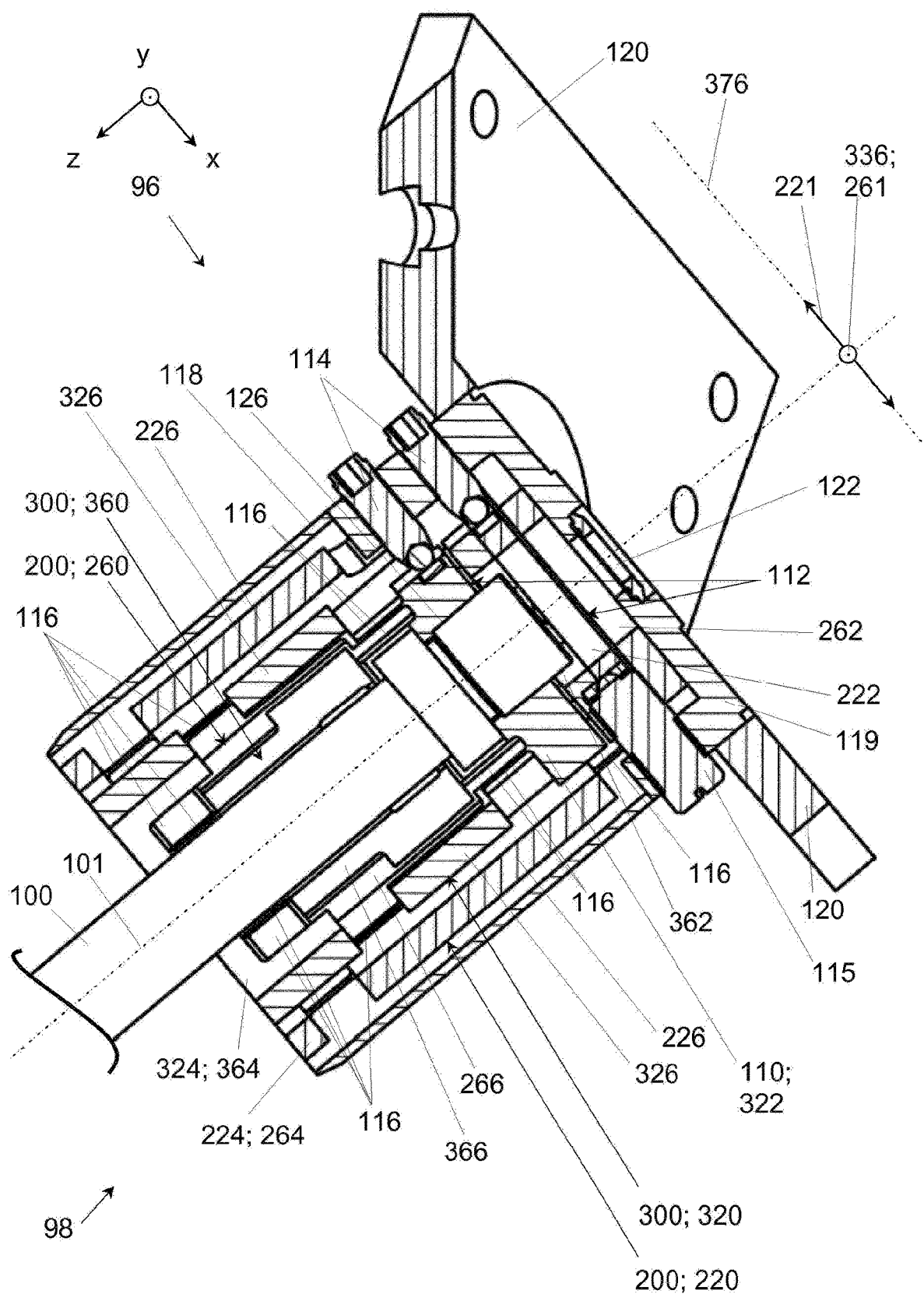
FIG. 2 a detailed view of the sectional view of the apparatus.

FIG. 2 is a detailed view of the sectional view of the apparatus 96 known from FIG. 1. The device 98 for spatial alignment of X-ray optics 100 comprises, as already described, substantially a parallel displacement mechanism 200 and a goniometer mechanism 300.

The parallel displacement mechanism 200 comprises first parallel kinematics 220 for parallel displacement of the lens 100 in the first parallel displacement direction 221 and second parallel kinematics 260 for parallel displacement of the lens 100 in the second parallel displacement direction 261. As shown, the two kinematics can be implemented as a first parallelogram guide 220 and as a second parallelogram guide 260.

The goniometer mechanism 300 comprises first goniometer kinematics 320 for the at least to some extent swiveling of the lens 100 about the first swivel axis 336 and second goniometer kinematics 360 for the at least to some extent swiveling of the lens about the second swivel axis 376. As shown, these two kinematics 320, 360 can be implemented as a first symmetrical, trapezoidal guide 320 and as a second symmetrical, trapezoidal guide 360. "Symmetrical, trapezoidal guide" refers, by analogy to a parallelogram guide, to the functional geometry of the guide (in the starting position shown) and not necessarily the optical appearance of the guide.

As can be seen from FIG. 2, the goniometer mechanism 300 can, particularly in the starting position, be arranged coaxially between the parallel displacement mechanism 200 and the lens axis 101.

The kinematics 220, 260, 320, 360 in each case comprise a first counter-element 222, 262, 322, 362, arranged between the swivel axes 336, 376 and a second counter-element 224, 264, 324, 364.

Specifically, the first parallelogram guide 220 comprises a first counter-element 222 and a second counter-element 224, connected together by means of two connecting elements 226. The second parallelogram guide 260 comprises a first counter-element 262 and a second counter-element 264, connected together by means of two connecting elements 266. Of the two connecting elements 266, only one is visible, which in in FIG. 2 extends behind the lens 100. As shown, the two second counter-elements 224, 264 can be integrally connected with one another, thus implemented as a common counter-element. The first counter-element 262 in addition serves to fix the device in the second housing part 119. This can, by way of example, take place by means of screwed connections (not shown). Between the two first counter-elements 222, 262 there is a gap 112, so that a relative movement between the first counter-elements 222, 262 is possible.

The first trapezoidal guide 320 comprises a first counter-element 322 and a second counter-element 324, which are connected to one another by means of two connecting elements 326. The second trapezoidal guide 360 comprises a first counter-element 362 and a second counter-element 364, which are connected to one another by means of two connecting elements 366. Of the two connecting elements 366, only one is visible, which in FIG. 2 extends behind the lens 100 and in front of the connecting element 266. As shown, the two second counter-elements 324, 364 can be integrally connected with one another, thus implemented as a common counter-element. The first counter-element 322 is implemented as one piece with the receiving element 110 and thus serves to receive and fix the lens 100. In the example, the lens 100 is screwed into the receiving element 110 by means of a screwed connection 126. Between the two first counter-elements 322, 362 there is a gap 112, allowing a relative movement between the first counter-elements 322, 362.

The parallel displacement mechanism 200 is connected with the goniometer mechanism 300 via the first counter-element 222 and the first counter-element 362, so that no relative movements between these are possible. In the example, these are screwed together.

According to the present nomenclature, the respective first counter-element 222, 262, 322, 362 is thus arranged between the swivel axes 336, 376 and the respective second counter-element 224, 264, 324, 364. In other words, the respective second counter-element 224, 264, 324, 364 spaced apart from the respective first counter-element 222, 262, 322, 362 in a positive z-direction.

The connections between the connecting elements 226, 266, 326, 366 and the counter-elements 222, 262, 322, 362, 224, 264, 324, 364 are made particularly advantageously by means of flexure bearings 116. The descriptions of the figures deal with these connections in more detail.

By using flexure bearings 116, both the parallel displacement mechanism 200 and the goniometer mechanism 300 can have a one-piece configuration.

Figure 3:
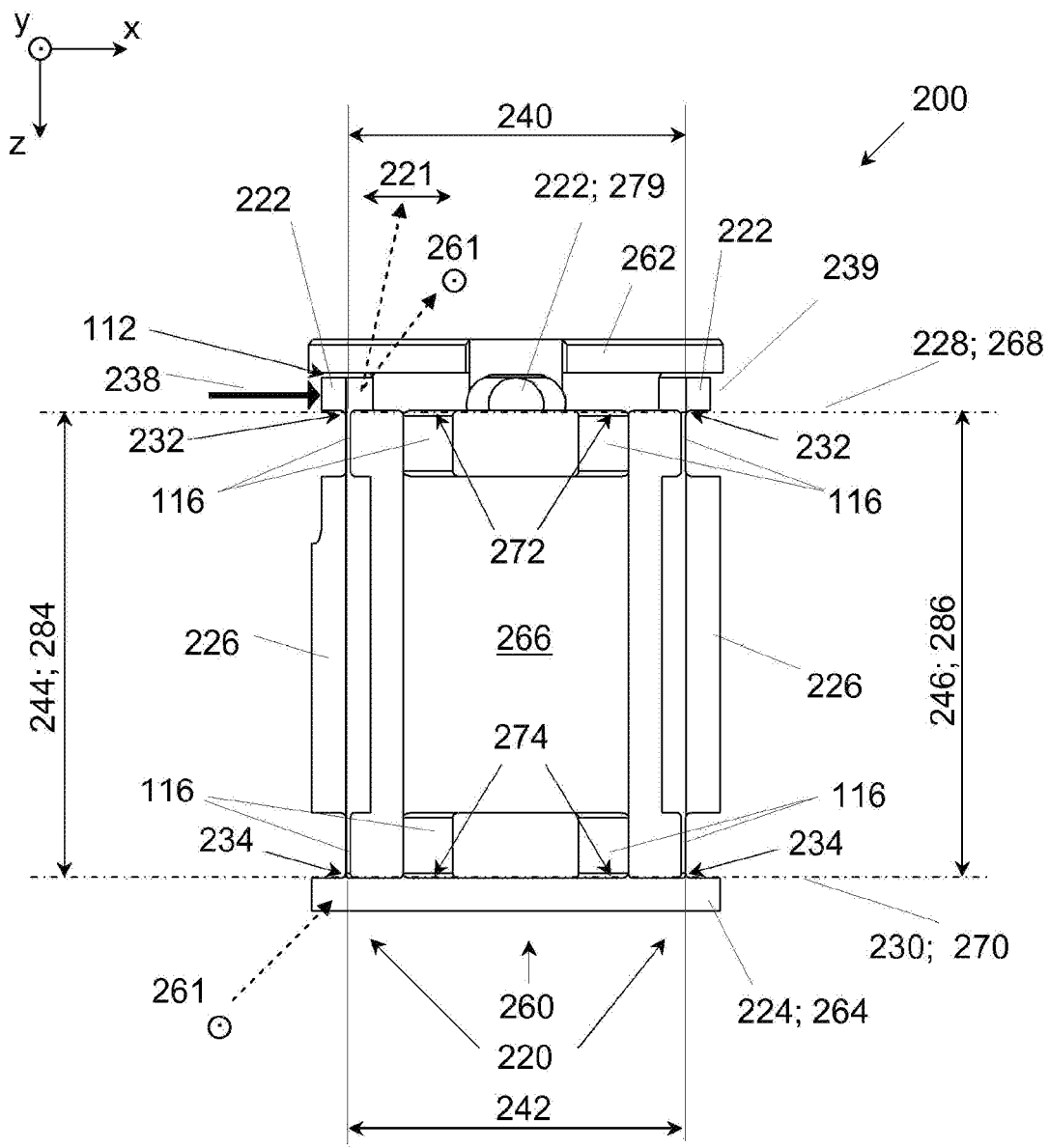
FIG. 3 a front view of a parallel displacement mechanism.
Figure 4:
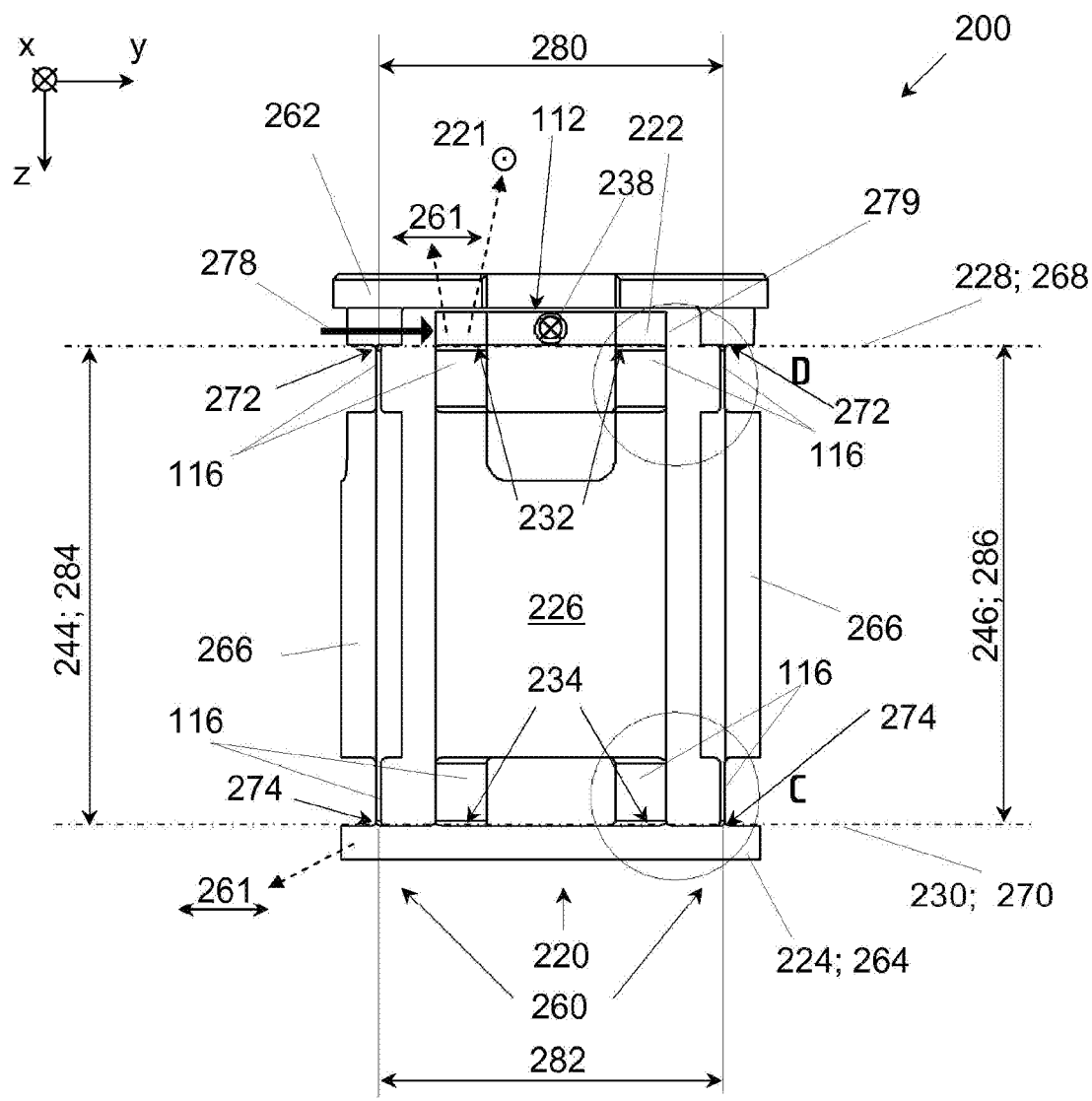
FIG. 4 a side view of the parallel displacement mechanism.
Figure 4:
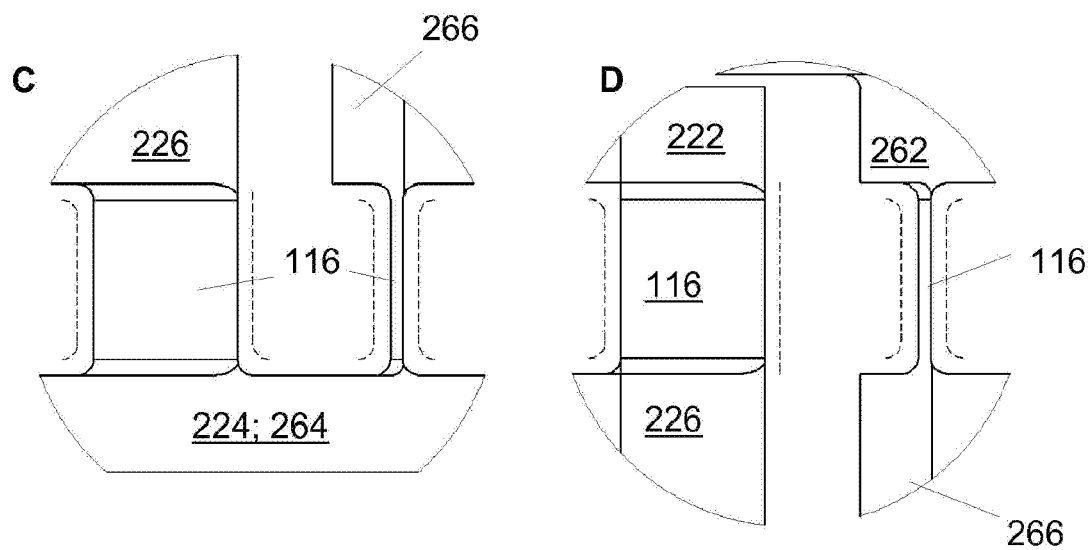

FIG. 3 is a front view of the parallel displacement mechanism 200, again viewed in the direction counter to the y-axis in the negative y-direction. In this view the first counter-element 222 of the first parallelogram guide 220 is partially concealed by the first counter-element 262 of the second parallelogram guide 260, so that the gap 112 (see particularly FIG. 4) between the first counter-elements 222, 262 is only partially visible. FIG. 4 is a side view of the parallel displacement mechanism 200 viewed in the direction of the x-axis, thus in the positive x-direction.

The flexure bearings 116 connect the connecting elements 226, 266 with the counter-elements 222, 262, 224, 264, wherein the connection is made via at least a first end 232, 272 (in the example shown respectively via two ends 232, 272) and at least a second end 234, 274 (in the example shown respectively via two ends 234, 274) of the connecting elements 226, 266. The flexure bearings 116 are dimensioned with regard to their flexural strengths or elasticities such that an effort for bending in the respective parallel displacement direction 221, 261 is substantially less than in other spatial directions.

In the first parallelogram guide 220 the connecting elements 226 are connected in a first connection plane 228, running along the first parallel displacement direction 221, respectively via two first ends 232 with the first counter-element 222. In the example shown, the first connection plane 228 is an x,y-plane. In a second connection plane 230, spaced apart from and parallel to the first connection plane 228, the connecting elements 226 are respectively connected via two second ends 234 with the second counter-element 224. The second counter-element 224 and the second connection plane 230 are offset to the first counter-element 222 and to the first connection plane 228 in the positive z-direction.

In the first parallel displacement direction 221 the two first ends 232 of one of the connecting elements 226 are at a first distance 240 from the two first ends 232 of the other connecting element 226. In this direction, the two second ends 234 of one of the connecting elements 226 also have a second distance 242 from the two second ends 234 of the other connecting element 226. The first distance 240 is equal to the second distance 242, making a parallelogram guide.

The result of this is also that in a plane running along the direction of the first parallel displacement direction 221 and at right angles to the two connection planes 228, 230, the respective distances 244, 246 between the respective first ends 232 and the respective second ends 234 of the connecting elements 226 are equal. The two first ends 232 and the two second ends 234 of the respective connecting element 226, in a direction parallel to the connection planes 228, 230 and at right angles to the first parallel displacement direction 221, thus in the example in the y-direction, are offset to one another.

In order to perform a parallel displacement of the lens 100 in the first parallel displacement direction 221, by means of an adjustment element 114 a first adjustment force 238 is introduced into the first counter-element 222, wherein the first adjustment force 238 comprises a component in the first parallel displacement direction 221. The first adjustment force 238 shown in the exemplary embodiment comprises a (single) component in the positive x-direction. Through the first adjustment force 238 therefore a bending of the flexure bearings 116 and thus a parallel displacement of the first counter-element 222 relative to the second counter-element 224 is achieved.

The parallel displacement comes to an end when an equilibrium of forces is arrived at. This is the result on the one side of the first adjustment force 238, acting in the positive x-direction and on the other side of forces resulting from the bending of the flexure bearings 116, and a spring force (not shown), applied by a spring element 115 and acting on a first counter-bearing 239 in the negative x-direction. By pre-tensioning the spring element 115 a parallel displacement in the negative x-direction can also be performed.

In the second parallelogram guide 260 the connecting elements 266 are connected in a first connection plane 268, running along the second parallel displacement direction 261, in each case via two first ends 272 with the first counter-element 262. In the example shown, the first connection plane 268 is an x,y-plane. In a second connection plane 270, spaced apart from and parallel to the first connection plane 268, the connecting elements 266 are connected via two second ends 274 with the second counter-element 264. The second counter-element 264 and the second connection plane 270 are offset to the first counter-element 262 and to the first connection plane 268 in the positive z-direction. In the second parallel displacement direction 261 the two first ends 272 of one of the connecting elements 266 have a first distance 280 from the two first ends 272 of the other connecting element 266. In this direction, the two second ends 274 of one of the connecting elements 266 also have a second distance 282 from the two second ends 274 of the other connecting element 266. The first distance 280 is equal to the second distance 282, making a parallelogram guide. The result of this is also is that in a plane in the direction of the second parallel displacement direction 261 and at right angles to the two connection planes 268, 270 the respective distances 284, 286 between the respective first ends 272 and the respective second ends 274 of the connecting elements 266 are equal. The two first ends 272 and the two second ends 274 of the respective connecting element 266, in a direction parallel to the connection planes 268, 270 and at right angles to the second parallel displacement direction 261, thus in the example in the x-direction, are offset to one another.

In the exemplary embodiment, the first connection planes 228 and 268, as well as the second connection planes 230, 270 of the parallelogram guides 220, 260 are identical.

In order to perform a parallel displacement of the lens 100 in the second parallel displacement direction 261, by means of an adjustment element 114 a second adjustment force 278 is introduced in the first counter-element 222 of the first parallelogram guide 220, wherein the second adjustment force 278 comprises a component in the second parallel displacement direction 261. The second adjustment force 278 shown in the exemplary embodiment comprises a (single) component in the positive y-direction. The second adjustment force 278 is transmitted via the flexure bearings 116 of the first parallelogram guide 220 that are resistant to bending in the second parallel displacement direction 261, to the common second counter-element 224, 264 of the first and the second parallelogram guide 220, 260. Through the second adjustment force 278 therefore a bending of the flexure bearings 116 of the second parallelogram guide 260 and thus a parallel displacement of the second counter-element 264 relative to the second counter-element 264 in the second parallel displacement direction 261 is achieved.

The parallel displacement comes to an end, when an equilibrium of forces in the second parallel displacement direction 261 is arrived at. This is the result on the one side of the second adjustment force 278, acting in the positive y-direction and on the other side of forces resulting from the bending of the flexure bearings 116, and a spring force (not shown), applied by a spring element 115 and acting on a first counter-bearing 279 in the negative y-direction. By pre-tensioning the spring element 115 a parallel displacement in the negative y-direction can also be performed.

In details C and D, the flexure bearings 116 are shown in detail. These comprise, as necessary, rounded transitions to the counter-elements 222, 224, 262, 264 and the connecting elements 226, 266—indicated by symbolic broken lines.

Figure 5:
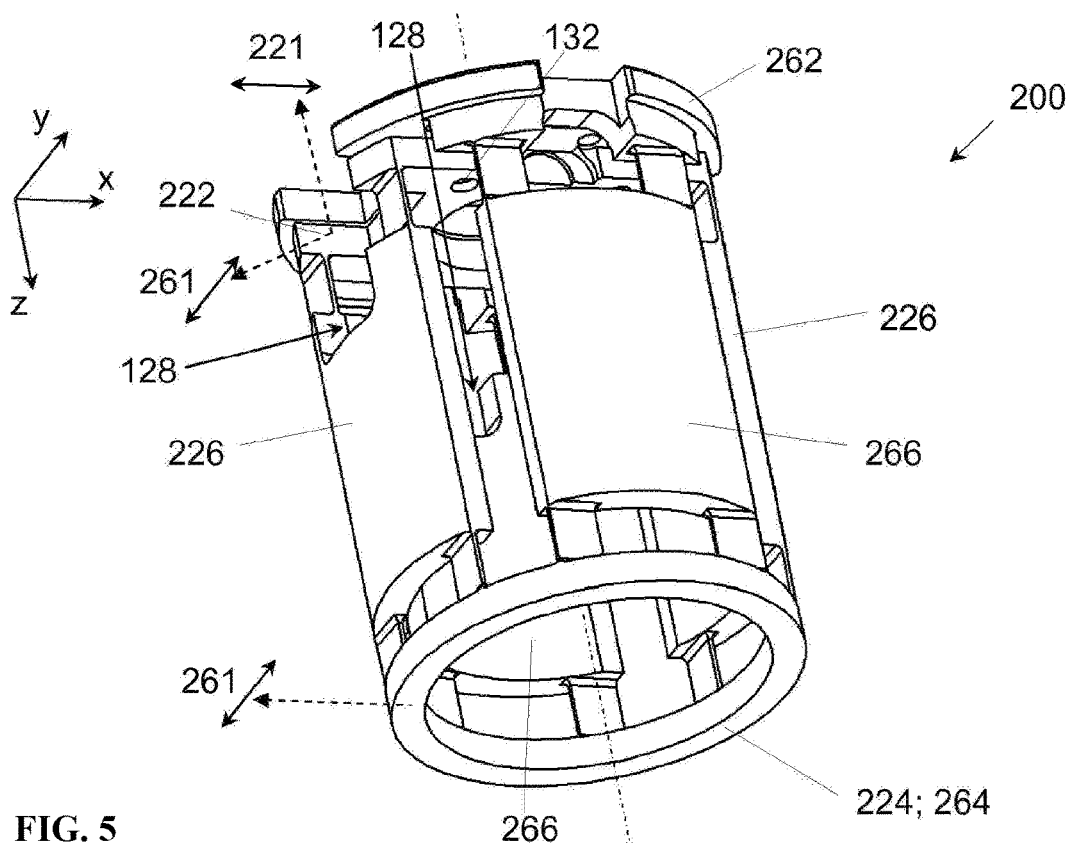
FIG. 5 a first isometric view of the parallel displacement mechanism.
Figure 6:
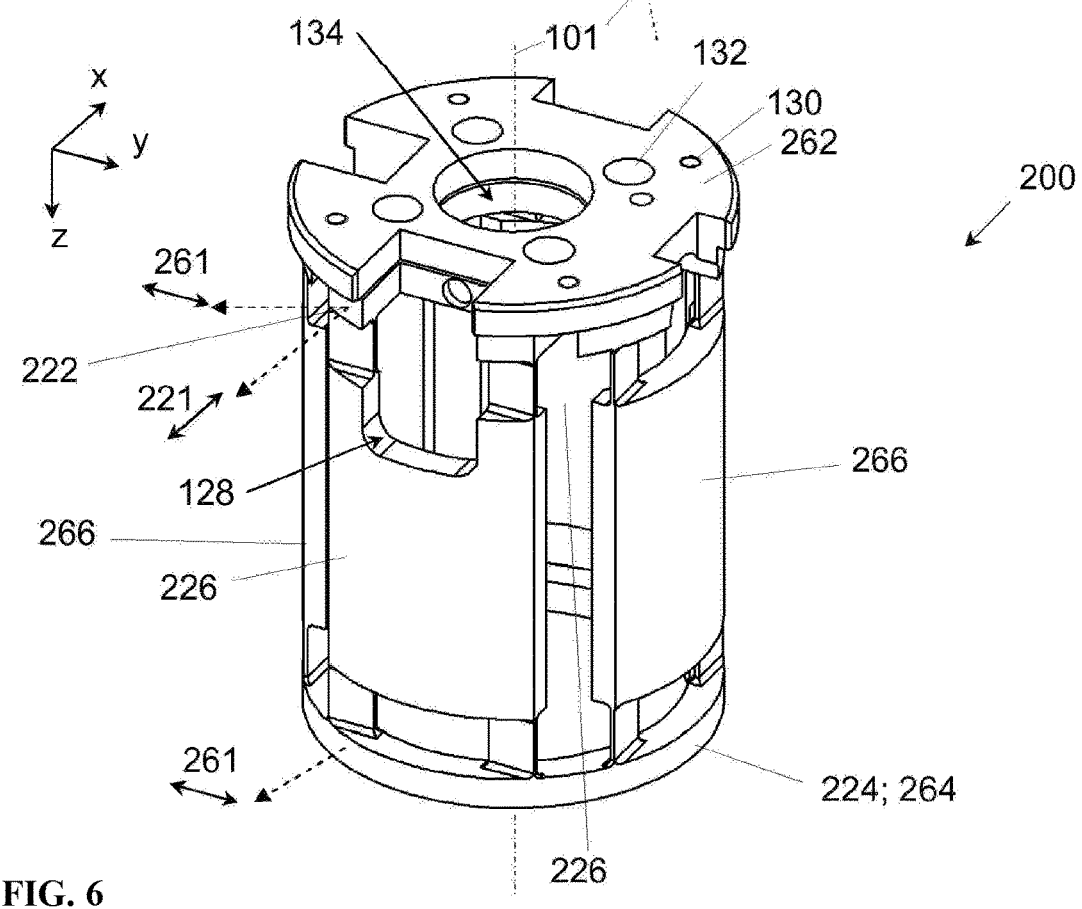
FIG. 6 a second isometric view of the parallel displacement mechanism.

FIGS. 5 and 6 are isometric views of the parallel displacement mechanism 200. The coaxial structure of the parallel displacement mechanism 200 about the lens axis 101 is clearly visible. In addition, an opening 134 is visible, passing through the parallel displacement mechanism 200 and the device 98 as a whole. The opening 134 serves to receive the goniometer mechanism 300. In addition, threaded holes 130 in the first counter-element 262 (FIG. 6) are visible, serving for fixing the parallel displacement mechanism 200 and thus the device 98 in the second housing part 119. The through-holes 132 in the first counter-element 222 (FIG. 5) serve for connecting the parallel displacement mechanism 200 with the goniometer mechanism 300. By means of the through-holes 132 in the first counter-element 262 (FIG. 6) screws can be passed through the first counter-element 262 and their screw heads introduced into the first counter-element 222. The parallel displacement mechanism 200, like the goniometer mechanism 300 discussed below, is implemented as one piece.

Figure 7:
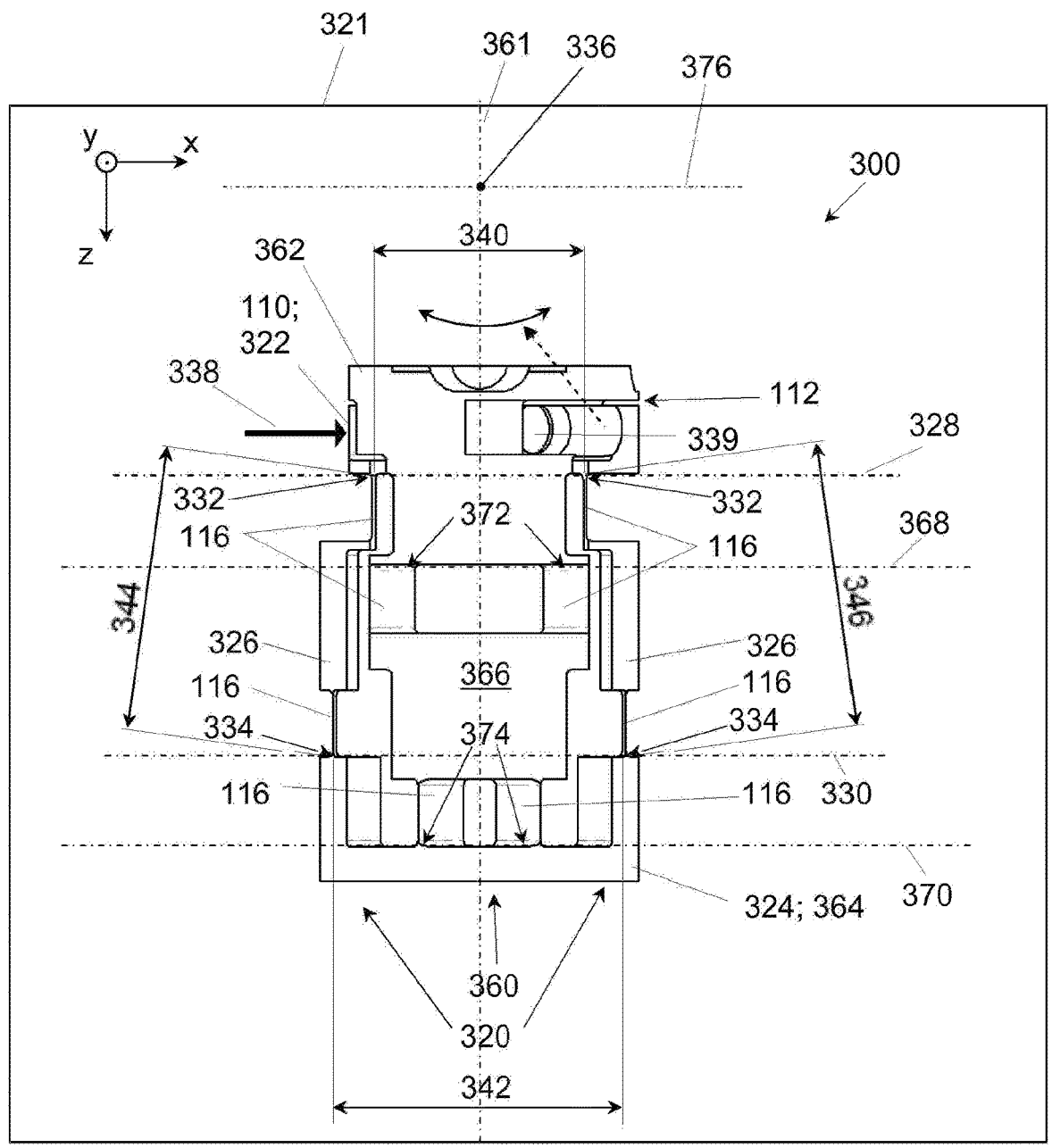
FIG. 7 a front view of a goniometer mechanism.
Figure 8:
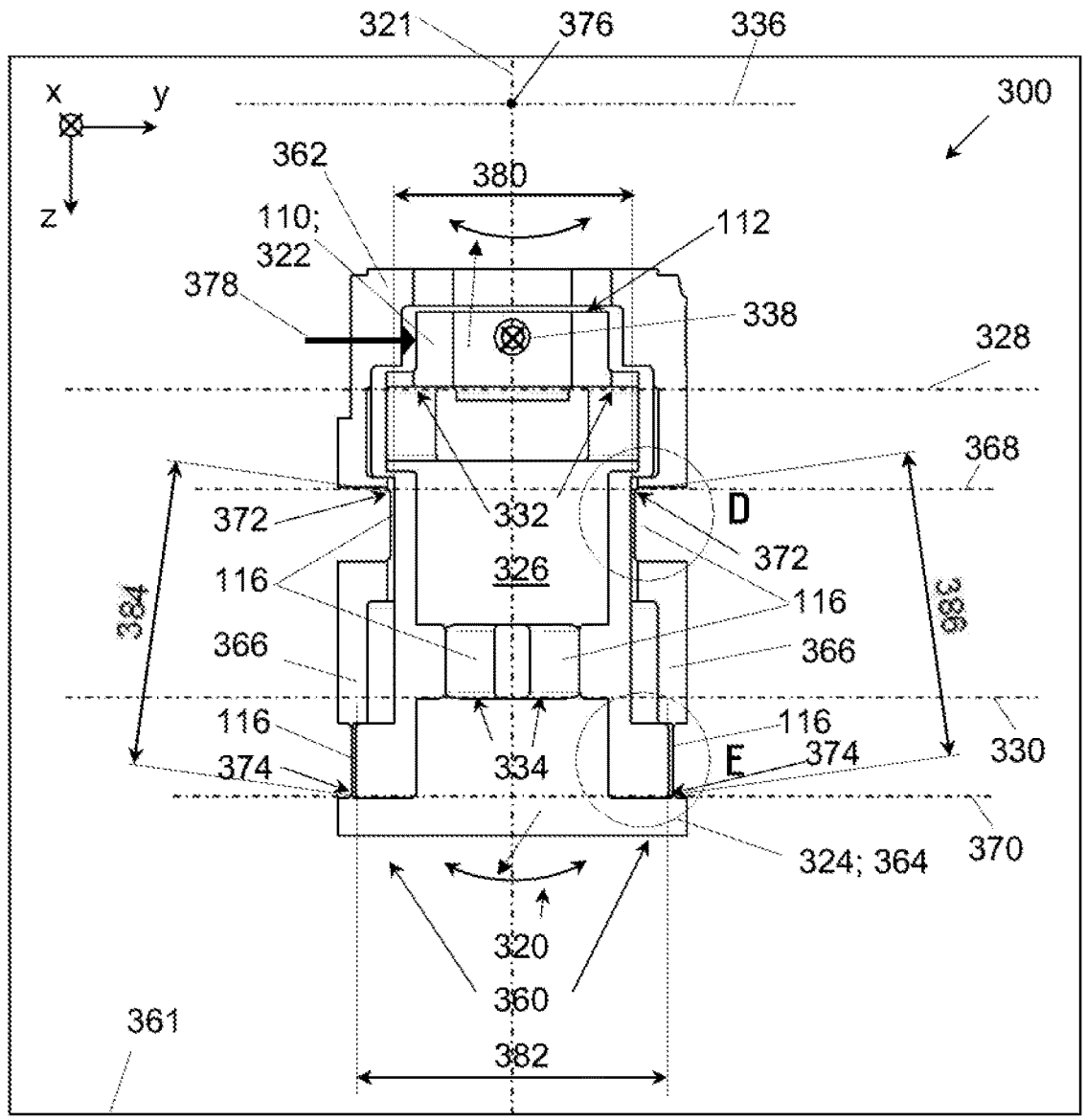
FIG. 8 a side view of the goniometer mechanism.
Figure 8:
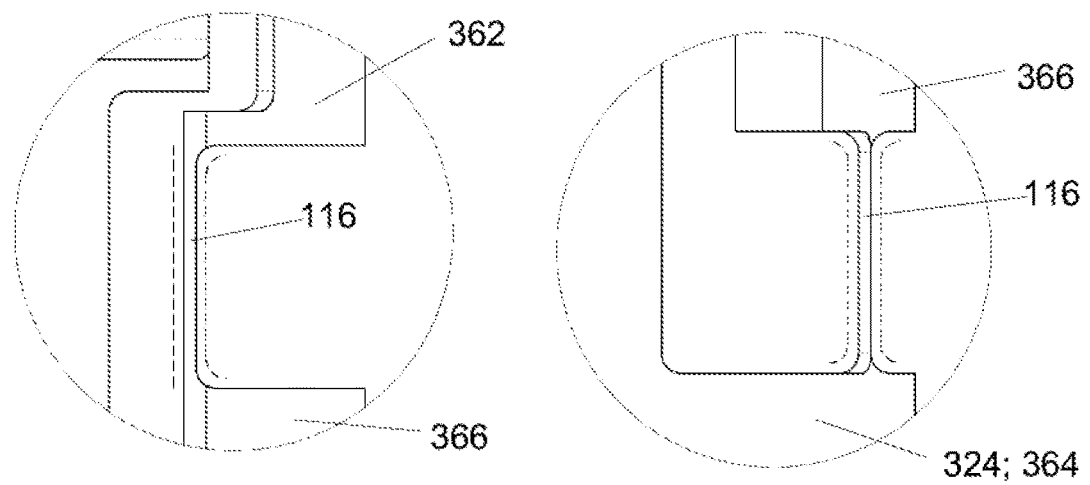

FIG. 7 is a front view of the goniometer mechanism 300 viewed in the direction counter to the y-axis in the negative y-direction. In this view, the first counter-element 322 of the first symmetrical, trapezoidal guide 320 is partially concealed by the first counter-element 362 of the second symmetrical, trapezoidal guide 360, so that the gap 112 (see particularly FIG. 8) between the first counter-elements 322, 362 is only partially visible. FIG. 8 is a side view of the goniometer mechanism 300 seen in the direction of the x-axis, thus in the positive x-direction.

The flexure bearings 116 connect the connecting elements 326, 366 with the counter-elements 322, 362, 324, 364, wherein the connection is made via at least a first end 332, 372 (in the example shown via in each case two ends 332, 372) and at least a second end 334, 374 (in the example shown via in each case two ends 334, 374) of the connecting elements 326, 366. The flexure bearings 116 are dimensioned with regard to their flexural strengths or elasticities such that an effort for bending about the first swivel axis 336 (thus a bending in the x-direction) or about the second swivel axis 376 (thus a bending in the y-direction) is substantially less than in other spatial directions.

In the first trapezoidal guide 320 the connecting elements 326 in a first connection plane 328, running parallel to the first swivel axis 336, are in each case connected via two first ends 332 with the first counter-element 322. In a second connection plane 330, similarly running parallel to the first swivel axis 336 and spaced apart from the first connection plane 328, the connecting elements 326 are in each case via two second ends 334 connected with the second counter-element 324. In the example shown, the second connection plane 330 is an x,y-plane. In addition, in the starting position shown the first connection plane 328 is parallel to the second connection plane 330. The second counter-element 324 and the second connection plane 330 are offset to the first counter-element 322 and to the first connection plane 328 in the positive z-direction.

In a direction running along the first connection plane 328 and at right angles to the first swivel axis 336 (in the example in the x-direction) the two first ends 332 of one of the connecting elements 326 have a first distance 340 to the two first ends 332 of the other connecting element 326. In one direction running along the second connection plane 330 and at right angles to the first swivel axis 336 (in the example in the x-direction) the two second ends 334 of one of the connecting elements 326 also have a second distance 342 to the two second ends 334 of the other connecting element 326. The first distance 340 is smaller than the second distance 342.

In directions running along a plane 321, running at right angles to the first swivel axis 336, the respective distances 344, 346 between the respective first ends 332 and the respective second ends 334 of the connecting elements 326 are equal. The two first ends 332 and the two second ends 334 of the respective connecting element 326 in the direction of the first swivel axis 336, thus in the example in the y-direction, are offset to one another.

In order to perform a goniometer movement of the lens 100 about the first swivel axis 336, by means of an actuator 117 a first pivot force 338 is introduced into the first counter-element 322, wherein the first pivot force 338 comprises a component at right angles to the first swivel axis 336 and parallel to the first connection plane 328. The first pivot force 338 shown in the exemplary embodiment comprises a (single) component in the positive x-direction. Through the first pivot force 338 therefore a bending of the flexure bearings 116 and thus a goniometer movement of the first counter-element 322 is achieved, in that the first counter-element 322 at least to some extent swivels about the first swivel axis 336. Provided the second trapezoidal guide 360 is not operated, the lens 100 is thus to some extent swiveled in the plane 321.

The goniometer movement comes to an end when an equilibrium of forces is arrived at. This is the result on the one side of the first pivot force 338, acting in the positive x-direction and on the other side of forces resulting from the bending of the flexure bearings 116, and a spring force (not shown), applied by a spring element 115 and acting on a combined counter-bearing 339 inter alia in the negative x-direction. The spring element, acting on the combined counter-bearing 339, due to the inclined position, applies a spring force within the x,y-plane to the first counter-element 322, which counteracts both the first pivot force 338, and also a second pivot force 378 (see FIG. 8). By pre-stressing the spring element 115 a goniometer movement in the opposing swivel direction about the first swivel axis 336 can be ensured.

In the second trapezoidal guide 360 the connecting elements 366 are connected in a first connection plane 368, running parallel to the second swivel axis 376, in each case via two first ends 372 with the first counter-element 362. In the example shown, the first connection plane 368 is an x,y-plane. In a second connection plan 370, similarly running parallel to the second swivel axis 376 and spaced apart from the first connection plane 368, the connecting elements 366 are connected via in each case two second ends 374 with the second counter-element 364. In the starting position shown, the second connection plane 370 is parallel to the first connection plane 368. The second counter-element 364 and the second connection plane 370 are offset to the first counter-element 362 and to the first connection plane 368 in the positive z-direction.

In a direction running along the first connection plane 368 and at right angles to the second swivel axis 376 (in the example in the y-direction) the two first ends 372 of one of the connecting elements 366 has a first distance 380 to the two first ends 372 of the other connecting element 366. In a direction running along the second connection plane 370 and at right angles to the second swivel axis 376 (in the example in the y-direction) the two second ends 374 of one of the connecting elements 366 have a second distance 382 to the two second ends 374 of the other connecting element 366. The first distance 380 is smaller than the second distance 382.

In directions along the course of a plane 361, running at right angles to the second swivel axis 376, the respective distances 384, 386 between the respective first ends 372 and the respective second ends 374 of the connecting elements 366 are equal. The two first ends 372 and the two second ends 374 of the respective connecting element 366 are, in the direction of the second swivel axis 376, thus in the example in the x-direction, offset to one another.

In order to perform a goniometer movement of the lens 100 about the second swivel axis 376, by means of a further actuator 117 a second pivot force 378 is introduced into the first counter-element 322 of the first trapezoidal guide 320, wherein the second pivot force 378 comprises a component at right angles to the second swivel axis 376 and parallel to the second connection planes 370. The second pivot force 378 shown in the exemplary embodiment comprises a (single) component in the positive y-direction. The second pivot force 378 is transmitted via the flexure bearings 116 of the first trapezoidal guide 320, that are bend-resistant in a direction at right angles to the second swivel axis 376 and parallel to the second connection planes 370 to the common second counter-element 324, 364 of the first and second trapezoidal guides 320, 360. Through the second pivot force 378 therefore a bending of the flexure bearings 116 of the second trapezoidal guide 360 and thus a goniometer movement of the second counter-element 324, 364 and the first counter-element 322 at least to some extent about the second swivel axis 376 is achieved. Provided the first trapezoidal guide 320 is not operated, the lens 100 is thus to some extent rotated in the plane 361.

The goniometer movement comes to an end when an equilibrium of forces is arrived at. This is the result on the one side of the second pivot force 378, acting in the positive y-direction and on the other side of the forces resulting from the bending of the flexure bearings 116, and a spring force (not shown), applied by a spring element 115 acting on the combined counter-bearing 339, inter alia in the negative y-direction. The spring element 115, acting on the combined counter-bearing 339, as already discussed, due to the inclined position applies a spring force within the x,y-plane to the first counter-element 322, counteracting both the first pivot force 338, and the second pivot force 378. By prestressing the spring element 115 a goniometer movement in the opposing swivel direction about the first second swivel axis 376 can be performed.

Instead of a combined counter-bearing 339, similarly to the parallel displacement mechanism 200, a second separate counter-bearing can also be used. In a variant in which the goniometer mechanism 300 can follow rapid operations by the at least one actuator 117 more quickly, the combined counter-bearing 339 can be dispensed with, and thus the spring element 115. To swivel goniometer mechanism 300, the respective actuator 117 applies a compressive force to the first counter-element 322, and to swivel the goniometer mechanism 300 in the opposite direction a tractive force to the counter-element 322, wherein the forces of the actuators 117 and those of an elastic recovery of the flexure bearings 117 can at least partially compensate or also overcompensate one another.

Control of the at least one actuator 117 by means of the control device 97 typically takes place by path control, meaning that a path (travel) to be adjusted is specified to the actuator 117.

In the exemplary embodiment, the first connection planes 328 and 368, as well as the second connection planes 330, 370 of the trapezoidal guides 320, 360 are parallel to one another in the starting position shown.

In details D and E, the flexure bearings 116 are shown in detail. These comprise, as necessary, rounded transitions to the counter-elements 322, 324, 362, 364 and the connecting elements 326, 366—indicated by symbolic broken lines.

Figure 9:
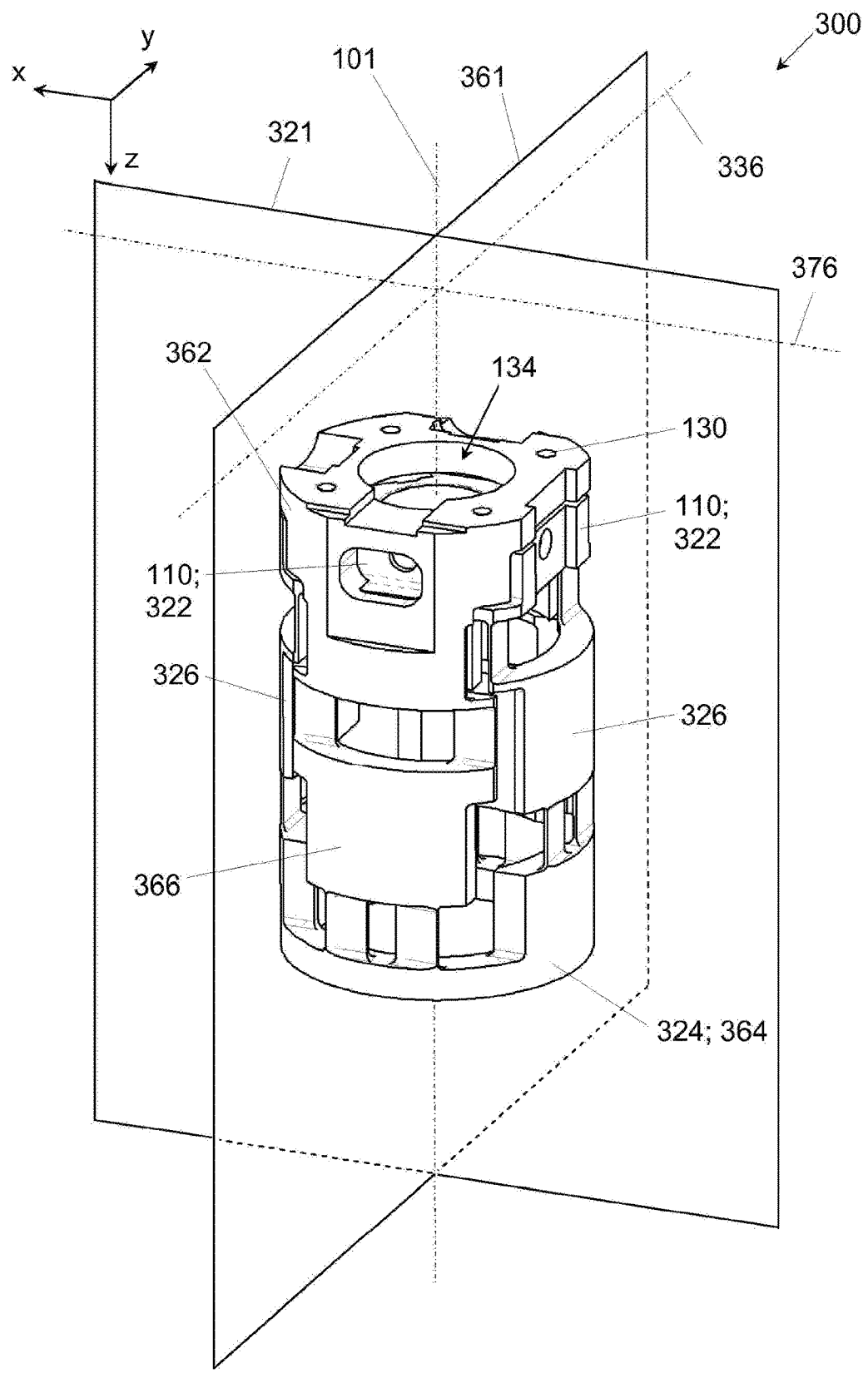
FIG. 9 a first isometric view of the goniometer mechanism.
Figure 10:
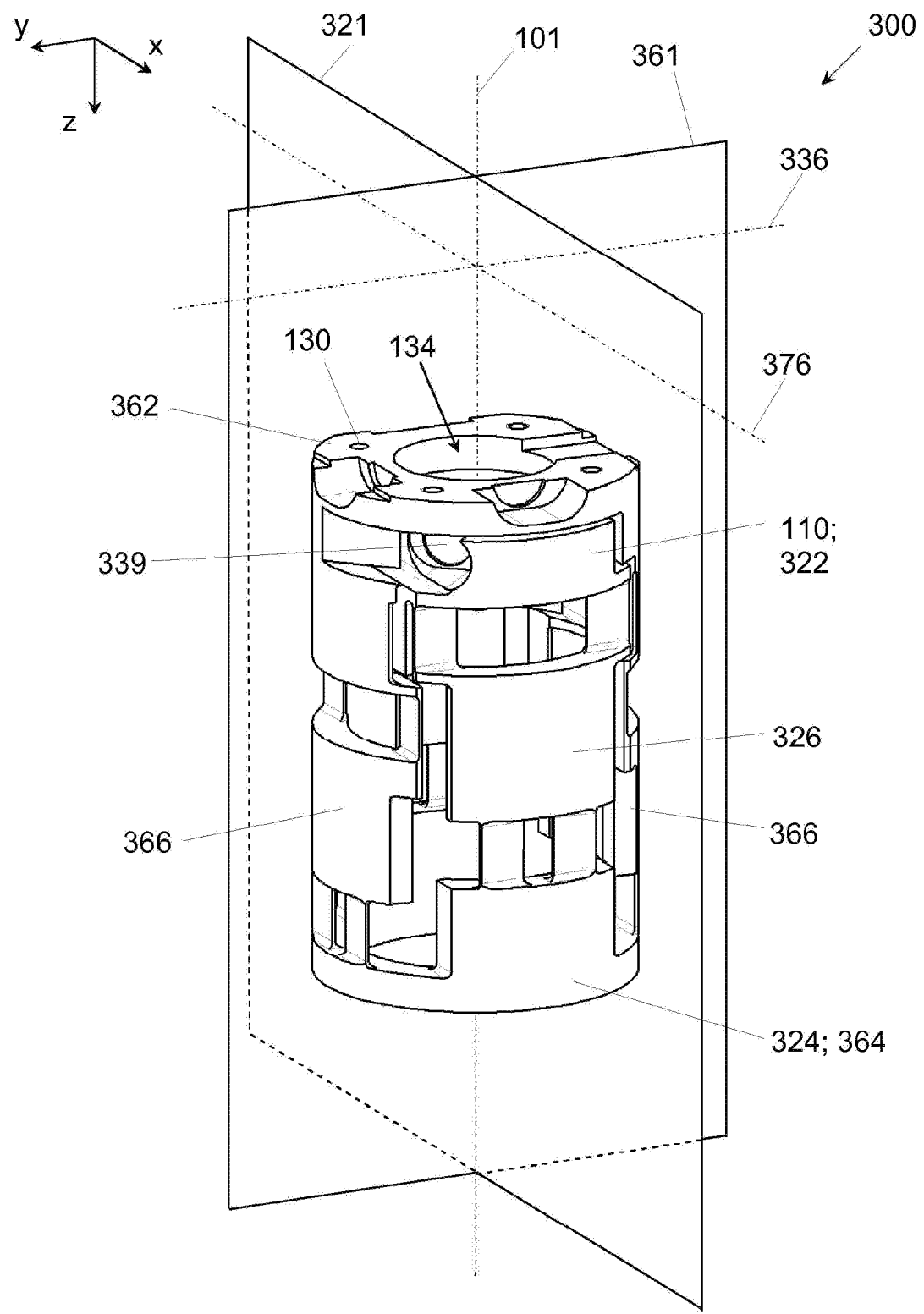
FIG. 10 a second isometric view of the goniometer mechanism.

FIGS. 9 and 10 are isometric views of the goniometer mechanism 300. The coaxial structure of the goniometer mechanism 300 about the lens axis 101 is clearly visible. In addition, an opening 134 is visible, passing through the goniometer mechanism 300 and the device 98 as a whole. Via the opening 134 the X-rays can pass through device 98. In addition, threaded holes 130 are visible in the first counter-element 362, which serve to connect the goniometer mechanism 300 with the parallel displacement mechanism 200.

As particularly visible in FIGS. 1, 2, 5, 6, 9 and 10, the parallel displacement mechanism 200 and the goniometer mechanism 300 have a substantially hollow cylindrical configuration and are arranged coaxially to one another, wherein the goniometer mechanism 300 is arranged coaxially in the parallel displacement mechanism 200.

Within the apparatus 96 (compare FIGS. 1 and 2), therefore:

the lens 100 is connected with the receiving element 110 (or screwed into the receiving element 110) and the receiving element 110 is configured with the first counter-element 322 of the first trapezoidal guide 320 as one piece;

the first counter-element 322 by means of the connecting elements 326 of the first trapezoidal guide 320 and its flexure bearings 116 is connected with the second counter-element 324, 364 with a one-piece configuration of the first and second trapezoidal guide 320, 360;

the second counter-element 324, 364 by means of the connecting elements 366 of the second trapezoidal guide 360 and its flexure bearings 116 is connected with the first counter-element 362 of the second trapezoidal guide 360;

the first counter-element 362 of the second trapezoidal guide 360 is connected (or screw-connected) with the first counter-element 222 of the first parallel guide 220;

the first counter-element 222 by means of the connecting elements 226 of the first parallelogram guide 220 and its flexure bearings 116 is connected with the second counter-element 224, 264 with a one piece configuration of the first and second parallelogram guide 220, 260;

the second counter-element 224, 264 by means of the connecting elements 266 of the second trapezoidal guide 260 and their flexure bearings 116 is connected with the first counter-element 262 of the second trapezoidal guide 360; and the first counter-element 262 of the second parallelogram guide 260 is connected (or screw-connected) with the second housing part 119 of the apparatus 96.

Thus, through the device 98 on the one hand an adjustment of an entry focal point 104 of an X-ray lens 100 to a focal spot 102, and on the other a goniometer mechanism 300 (a twin axis goniometer), are implemented, configured for swiveling the X-ray lens 100 about the first and second swivel axis 336, 376. The device 98 is characterized, inter alia, by its compactness, vacuum tightness and excellent accessibility, even in the tightest space and under technical limitations. This is achieved particularly also by implementation of the device 98 by means of flexure bearings 116.

Through the coaxial construction, maximum use is made of installation space, simplifying device integration.

The device 98 is characterized by a very small number of parts, since each of the two kinematics (axes) is implemented as a monolithic block. The embodiment shown is characterized also by a production-ready design and optimization. A number of excitation sources can also be used in one device, provided that the excitation points of all excitation sources can be calibrated with one another.

Figure 11:
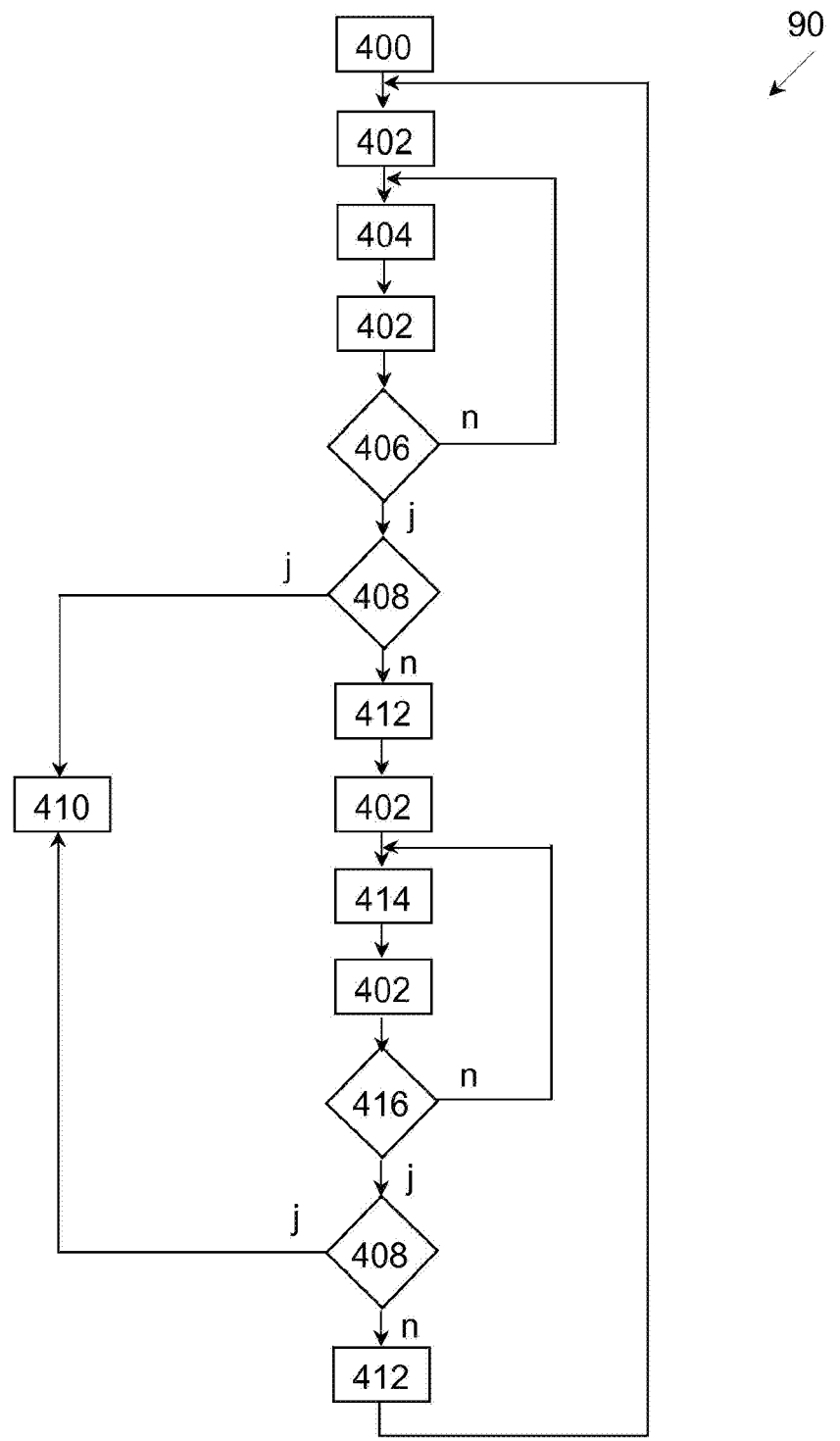
FIG. 11 a process flow according to a preferred embodiment.
Figure 12:
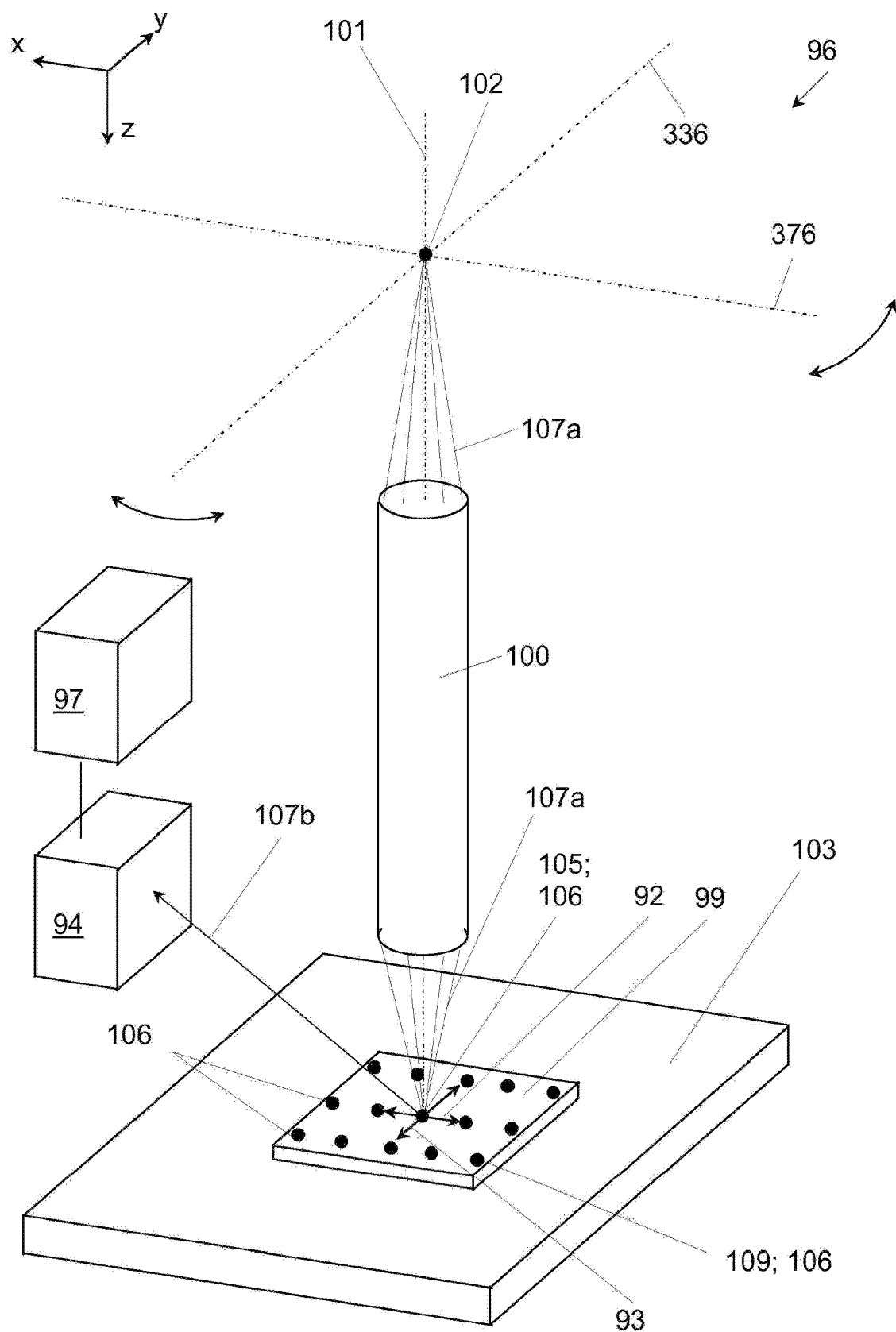
FIG. 12 a schematic representation of the process flow.

In the following, using FIGS. 11-14, the method 90 according to the invention is discussed based on a preferred embodiment of the invention:

The method 90 for scanning the sample 99 by means of the X-ray optics 100 for irradiating the sample 99 with X-rays 107a can comprise the following steps shown schematically in FIG. 11:

Firstly, in a step 400 a starting measuring point 109 is occupied in a corner of the sample 99 (see FIG. 13), in which the optical exit focal point 108 of the X-ray lens 100 is brought into line with the starting measuring point 109. This is achieved by displacing the optical exit focal point 108 and a measuring point 106 congruent with this in a negative first scanning direction 92*b*, according to the negative x-direction as far as the end of a preset measuring range. Additionally, the optical exit focal point 108 and thus also the congruent measuring point 106 are displaced in a negative second scanning direction 93*b*, according to the negative y-direction as far as the end of the preset measuring range.

Then a step 402 of the detection of the radiation 107*b* emanating from the sample 99 takes place. The emanating radiation 107*b* can, for example, be emitted, reflected or transmitted radiation. This can involve electromagnetic radiation, for example X-radiation or corpuscular radiation (electron beams). The emanating radiation 107*b* is detected by a detector 94 (see FIG. 12) and transmitted with the measured values correlating with the detected, emanating radiation 107*b* to the control device 97. The emanating radiation 107*b* results from the irradiation of the measuring point 106 with the X-rays 107*a* emanating from the X-ray optics 100.

Here, the sample 99 can be irradiated continuously, thus during the swiveling of the X-ray optics 100, and also only after occupation of the respective measuring point 106 with the X-radiation 107*a*. Detection of the radiation 107*b* emanating from the sample 99 can similarly take place continuously, thus during the swiveling of the X-ray optics 100, and also only after occupation of the respective measuring point 106.

Figure 13:
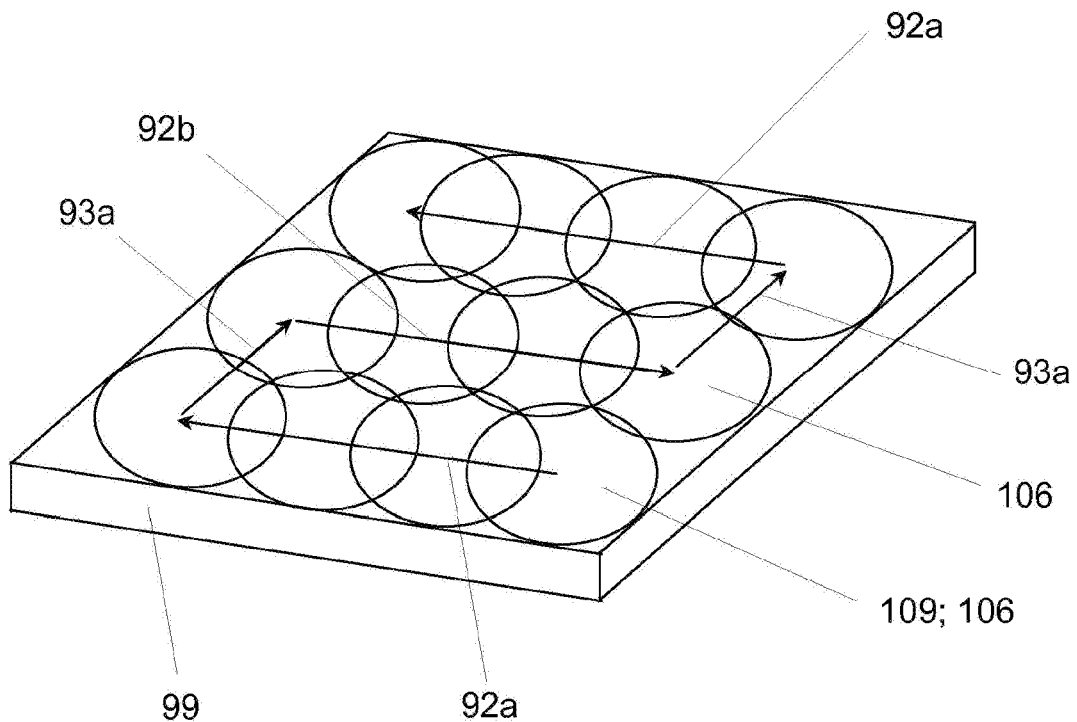
FIG. 13 a representation of the measuring points in a sample.

In a step 404 the measuring point 106 is displaced by one increment in the positive first scanning direction 92*a* (see FIG. 13). Then the step 402 of the detection of the radiation 107*b* emanating from the sample 99, together with transmission of the correlating values, is performed.

In a decision 406 a check is made whether an end of the measuring range in the positive first scanning direction 92*a* has been reached. Should this not be the case, the steps 404 and 402 are repeated until the end of the measuring range is reached.

If according to decision 406 the end of the measuring range has been reached, a decision 408 follows, in which it is queried whether the end of the measuring range in the positive second scanning direction 93*a* has been reached. Should this be the case, by means of the control device 97 according to a step 410 a combining with the measured values correlating with the detected radiation takes place to form an overall scan. The overall scan can, for example, be output via a monitor (not shown).

If according to decision 408 the end of the measuring range has not been reached, according to a step 412 a displacement of the measuring point 106 by one increment in the direction of the positive scanning direction 93*a* (see FIG. 13) takes place, and then according to step 402 a detection of emanating radiation 107*b*.

In a step 414 a displacement of the measuring point 106 by one increment in the negative first scanning direction 92*b* takes place. Then the step 402 of detection of the radiation 107*b* emanating from the sample 99, together with transmission of the correlating values is performed.

In a decision 416 a check is made whether an end of the measuring range in the negative first scanning direction 92*b* has been reached. Should this not be the case, steps 414 and 402 are repeated until the end of the measuring range has been reached.

If according to decision 416 the end of the measuring range has been reached, a decision 408 follows in which it is queried whether the end of the measuring range in the positive second scanning direction 93*a* has been reached. Should this be the case, by means of the control device 97 according to a step 410 the combining to form an overall scan takes place.

If according to decision 408 the end of the measuring range has not been reached, according to a step 412 a displacement of the measuring point 106 by one increment in the direction of the positive second scanning direction 93*a* takes place. Then the method is continued after the first step shown in FIG. 11.

Through this embodiment, a meandering scanning according to FIG. 13 is achieved.

As an alternative to the meandering scanning the method 90 after a negative first decision 408 (thus with the end of the measuring range in the positive second scanning direction 93*a* not yet reached) can be continued, in that a displacement of the measuring point 106 in the direction of the negative first scanning direction 92*b* takes place as far as the start of the measuring range. The X-ray optics 100 are thus swiveled back. This can take place at the same time, before or after step 412, with which a displacement of the measuring point 106 by one increment in the direction of the positive second scanning direction 93*a* is carried out. The method is then continued with the step 402 (which in FIG. 11 follows step 400), in which the emanating radiation is detected. Then the method is continued as shown in the top part of FIG. 11, with steps 404, 402 and the decision 406. Thus, following a scanned "line" in the positive first scanning direction 92*a* a line return always takes place, whereupon in the next line scanning is again in the positive first scanning direction 92*a*. Because the scanning always takes place in the positive first scanning direction 92*a*, measurement errors due to mechanical inaccuracies can be avoided.

Because the first swivel axis 336 and/or the second swivel axis 376 runs through the optical entry point 104 of the X-ray optics 100 and the optical entry point 104 has first been brought into line with the focal spot 102 of the tubes, during swiveling of the X-ray lens 100 a quantity of radiation 107*a* captured by the X-ray lens 100 does not change.

Due to the relatively small swivel angle of the X-ray optics about the two swivel axes 336, 376 of at most+−5° (particularly at most+−2°) a displacement of the exit focal point 108 in the z-direction can be disregarded.

The method 90 can comprise a step of the displacement of the sample 99 in the second scanning direction 93. In this way, the displacement of the measuring point 106 in the second scanning direction 93 by means of swiveling the X-ray optics 100 about the second swivel axis 376 can be dispensed with. The displacement of the sample 99 in the second scanning direction 93 can take place by, for example, displacing the sample table 103 together with the sample 99 in the negative second scanning direction 93*b*. In this way, the measuring point 106 is displaced in relation to the sample 99 in the positive second scanning direction 93*a*.

Figure 14:
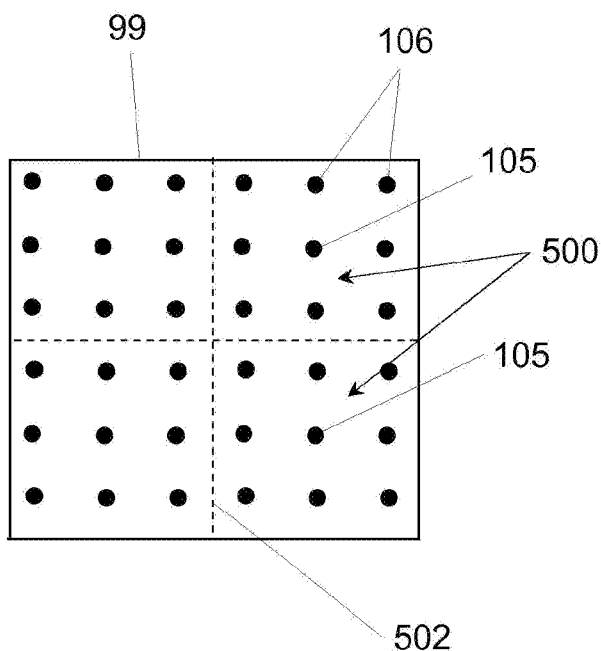
FIG. 14 a measuring grid.

Furthermore, a displacement of the sample 99 in the first scanning direction 92 and/or the second scanning direction 93 can also take place, in order to displace the measuring point 106 on the sample 99 within a measuring grid 502 from one grid area 500 to the next (see FIG. 14). Thus, relatively large displacements of the measuring point 106 from one grid area 500 to the next grid area 500 can take place by means of displacement of the sample 99, while to this end relatively small displacements within a respective grid area 500 by means of swiveling the X-ray optics 100 are performed. Thus, a possible measurement inaccuracy as a result of a displacement of the exit focal point 108 in the z-direction due to relatively large swiveling of the X-ray optics 100 is prevented.

By means of the method, by swiveling the X-ray optics 100 a very rapid and also low-vibration displacement of measuring point 106 can be achieved. This is made possible particularly through the use of the flexure bearings 116 within the trapezoidal guides 320, 360, since flexure bearings 116, unlike conventional hinges, do not have any adhesive friction and thus also no breakaway torques when overcoming the adhesive friction.

LIST OF REFERENCE NUMERALS

- 90 Method for scanning a sample by means of X-ray optics
- 92 First scanning direction
- 92a Positive first scanning direction
- 92b Negative first scanning direction
- 93 Second scanning direction
- 93a Positive second scanning direction
- 93b Negative second scanning direction
- 94 Detector
- 96 Apparatus
- 97 Control device
- 98 Device
- 99 Sample
- 100 X-ray optics/capillary-lens
- 101 Lens axis
- 102 Predetermined point/focal spot
- 103 Sample table
- 104 Optical entry point/entry focal point
- 105 Central measuring point
- 106 Measuring point
- 107a (Ingoing) X-rays
- 107b (Emanating) radiation
- 108 Optical entry point/exit focal point
- 109 Starting measuring point
- 110 Receiving element
- 112 Gap
- 114 Adjustment elements
- 115 Spring element
- 116 Flexural bearing
- 117 Actuator
- 118 First housing part
- 119 Second housing part
- 120 Holder
- 122 Window
- 124 Position of a spacer
- 126 Screwed connection
- 128 Recess
- 130 Threaded hole
- 132 Through-hole
- 134 Opening
- 200 Parallel displacement mechanism
- 220 First parallel kinematics/first parallelogram guide
- 221 First parallel displacement direction
- 222 First counter-element
- 224 Second counter-element
- 226 Connecting element
- 228 First connection plane
- 230 Second connection plane
- 232 First end
- 234 Second end
- 238 First adjustment force
- 239 First counter-bearing
- 240 First distance
- 242 Second distance
- 244 Distance between first and second end of a first connecting element
- 246 Distance between first and second end of a second connecting element
- 260 Second parallel kinematics/second parallelogram guide
- 261 Second parallel displacement direction
- 262 First counter-element
- 264 Second counter-element
- 266 Connecting element
- 268 First connection plane
- 270 Second connection plane
- 272 First end
- 274 Second end
- 278 Second adjustment force
- 279 Second counter-bearing
- 280 First distance
- 282 Second distance
- 284 Distance between first and second end of a first connecting element
- 286 Distance between first and second end of a second connecting element
- 300 Goniometer mechanism
- 320 First goniometer kinematics/first trapezoidal guide
- 321 Plane at right angles to the first swivel axis
- 322 First counter-element
- 324 Second counter-element
- 326 Connecting element
- 328 First connection plane
- 330 Second connection plane
- 332 First end
- 334 Second end
- 336 First swivel axis
- 338 First pivot force
- 339 Combined counter-bearing
- 340 First distance
- 342 Second distance
- 344 Distance between first and second end of a first connecting element
- 346 Distance between first and second end of a first connecting element
- 360 Second goniometer kinematics/second trapezoidal guide
- 361 Plane extending at right angles to the second swivel axis
- 362 First counter-element
- 364 Second counter-element
- 366 Connecting element
- 368 First connection plane
- 370 Second connection plane
- 372 First end
- 374 Second end
- 376 Second swivel axis
- 378 Second pivot force
- 380 First distance
- 382 Second distance
- 384 Distance between first and second end of a first connecting element
- 386 Distance between first and second end of a second connecting element
- 400 Occupation of a starting measuring point
- 402 Detection of emanating radiation
- 404 Displacement of the measuring point in the positive first scanning direction
- 406 Decision on whether the end of the measuring range in the positive first scanning direction has been reached 408 Decision on whether the end of the measuring range in the positive second scanning direction has been reached
410 Combining to form an overall scan
412 Displacement of the measuring point in the positive second scanning direction
414 Displacement of the measuring point in the negative first scanning direction
416 Decision on whether the end of the measuring range in the negative first scanning direction has been reached
500 Grid area
502 Measuring grid

The invention claimed is:

1. An apparatus for scanning a sample comprising:
X-ray optics for irradiating a sample with X-rays;
a goniometer mechanism connected to the X-ray optics, wherein the goniometer mechanism is configured to carry out a swiveling of the X-ray optics about a first swivel axis, wherein the goniometer mechanism comprises two trapezoidal guides, wherein the two trapezoidal guides comprise first counter-elements and second counter-elements, which are connected by pairs of connecting elements, wherein the first counter-elements are arranged between the second counter-element of the respective guide and the first swivel axis and the two second counter-elements of the two trapezoidal guides are connected immovably to one another or have a one-piece embodiment;
at least one actuator, which is configured to actuate the goniometer mechanism; and
a control device, which is configured to carry out a method for scanning the sample by means of the X-ray optics for irradiating the sample with X-rays, wherein the method comprises:
  (a) displacing a measuring point, defined by an optical exit point of the X-ray optics, in the sample in a first scanning direction by means of swiveling the X-ray optics about the first swivel axis;
  (b) detecting radiation emanating from the sample at, at least, two measuring points along the first scanning direction; and
  (c) combining measured values correlating with the detected radiation to form an overall scan.

2. The apparatus according to claim 1, wherein the goniometer mechanism is configured to carry out a swiveling of the X-ray optics about a second swivel axis.

3. The apparatus according to claim 1, wherein the X-ray optics is a polycapillary lens.

4. The apparatus according to claim 1, wherein the actuator comprises a piezo element.

5. The apparatus according to claim 1, wherein the two trapezoidal guides comprise a first trapezoidal guide and a second trapezoidal guide, wherein
the first counter-element of the first trapezoidal guide is immovably connected to the X-ray optics,
the second counter-element of the first trapezoidal guide is immovably connected with the second counter-element of the second trapezoidal guide or has a one-piece embodiment therewith, and
the first counter-element of the second trapezoidal guide is adapted for fixing the apparatus.

6. The apparatus according to claim 5, wherein the two trapezoidal guides have a nested arrangement.

7. The apparatus according to claim 1, wherein the goniometer mechanism, comprises flexure bearings.

8. The apparatus according to claim 1, wherein the two trapezoidal guides have a nested arrangement.

9. The apparatus according to claim 1, wherein the goniometer mechanism has a one-piece configuration.

10. A method for scanning a sample by means of X-ray optics for irradiating the sample with X-rays, comprising the following steps:
  (a) displacing a measuring point, defined by an optical exit point of the X-ray optics, in the sample in a first scanning direction by means of swiveling the X-ray optics about a first swivel axis, wherein the first swivel axis passes through a focal spot of an X-ray tube;
  (b) detecting radiation emanating from the sample at, at least, two measuring points along the first scanning direction;
  (c) combining measured values correlating with the detected radiation to form an overall scan, wherein the combining takes place with spatial resolution, the measured values are associated with location information, and the location information is determined as a function of a swivel angle of the swiveling of the X-ray optics.

11. An apparatus for scanning a sample comprising:
X-ray optics for irradiating a sample with X-rays;
a goniometer mechanism connected to the X-ray optics, wherein the goniometer mechanism is configured to carry out a swiveling of the X-ray optics about a first swivel axis, wherein the first swivel axis passes through a focal spot of an X-ray tube;
at least one actuator, which is configured to actuate the goniometer mechanism; and
a control device, which is configured to carry out the method according to claim 10.

* * * * *